(12) United States Patent
Jun et al.

(10) Patent No.: US 11,169,871 B2
(45) Date of Patent: Nov. 9, 2021

(54) DATA STORAGE DEVICE AND OPERATING METHOD THEREOF

(71) Applicant: SK hynix Inc., Gyeonggi-do (KR)

(72) Inventors: Jang Hwan Jun, Gyeonggi-do (KR); Duck Hoi Koo, Gyeonggi-do (KR); Soong Sun Shin, Gyeonggi-do (KR); Yong Tae Kim, Gyeonggi-do (KR); Yong Chul Kim, Gyeonggi-do (KR); Cheon Ok Jeong, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 2 days.

(21) Appl. No.: 16/847,205

(22) Filed: Apr. 13, 2020

(65) Prior Publication Data

US 2020/0241955 A1    Jul. 30, 2020

Related U.S. Application Data

(63) Continuation-in-part of application No. 16/014,666, filed on Jun. 21, 2018, now Pat. No. 10,657,046, and
(Continued)

(30) Foreign Application Priority Data

| Feb. 23, 2017 | (KR) | ......................... 10-2017-0023891 |
| May 19, 2017 | (KR) | ......................... 10-2017-0062029 |
| Nov. 28, 2017 | (KR) | ......................... 10-2017-0160847 |

(51) Int. Cl.
*G06F 11/10* (2006.01)
*G06F 3/06* (2006.01)

(52) U.S. Cl.
CPC .............. *G06F 11/10* (2013.01); *G06F 3/064* (2013.01); *G06F 3/0619* (2013.01); *G06F 3/0659* (2013.01); *G06F 3/0679* (2013.01)

(58) Field of Classification Search
CPC .... G06F 11/10; G06F 11/1048; G06F 3/0619; G06F 3/0644; G06F 3/0679
See application file for complete search history.

(56) References Cited

U.S. PATENT DOCUMENTS

| 2014/0143477 A1 | 5/2014 | Lin et al. |
| 2015/0355839 A1 | 12/2015 | Shim |

(Continued)

FOREIGN PATENT DOCUMENTS

| CN | 1821980 A | 8/2006 |
| CN | 101147133 B | 5/2012 |

(Continued)

OTHER PUBLICATIONS

Office Action issued by the Taiwan Intellectual Property Office (TIPO) dated Sep. 17, 2021.

*Primary Examiner* — Nadeem Iqbal
(74) *Attorney, Agent, or Firm* — IP & T Group LLP

(57) ABSTRACT

A data storage device includes a nonvolatile memory device including a plurality of memory blocks and a controller for controlling the nonvolatile memory device. A plurality of management blocks includes first and second management blocks managed by the controller. The second management block stores start data and then stores integrity data. The first management block stores a storage location of the second management block. An integrity checker checks integrity of data associated with the first and second management blocks.

17 Claims, 33 Drawing Sheets

Related U.S. Application Data a continuation-in-part of application No. 15/829,227, filed on Dec. 1, 2017, now Pat. No. 10,649,840, and a continuation-in-part of application No. 15/785,586, filed on Oct. 17, 2017, now Pat. No. 10,656,846.

(56) References Cited

U.S. PATENT DOCUMENTS

2016/0284397 A1* 9/2016 Kim .................... G11C 11/5628
2016/0350182 A1* 12/2016 Tsutsui ................ G06F 11/2221

FOREIGN PATENT DOCUMENTS

| CN | 103455430 A | 12/2013 |
| KR | 10-2011-0030069 A | 3/2011 |

* cited by examiner

FIG. 3
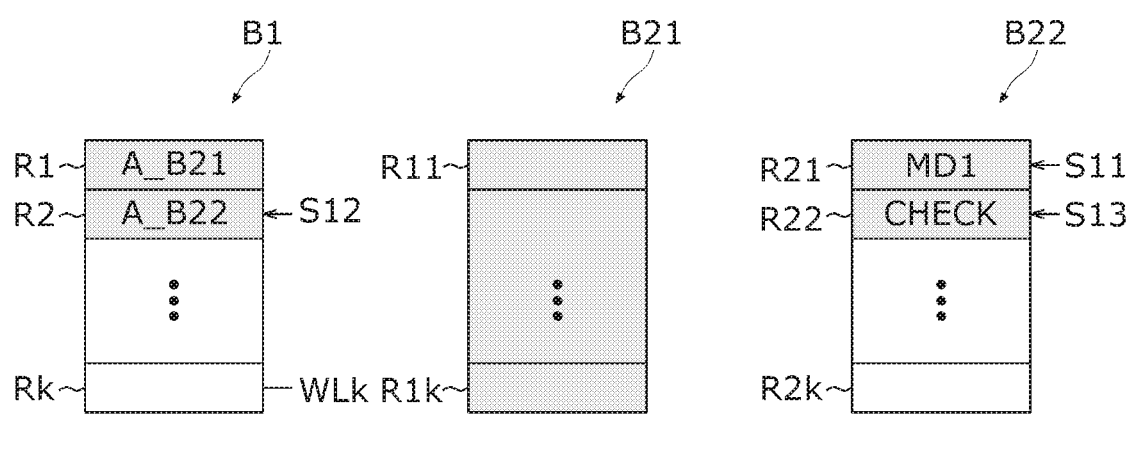
 : Written

FIG. 6A
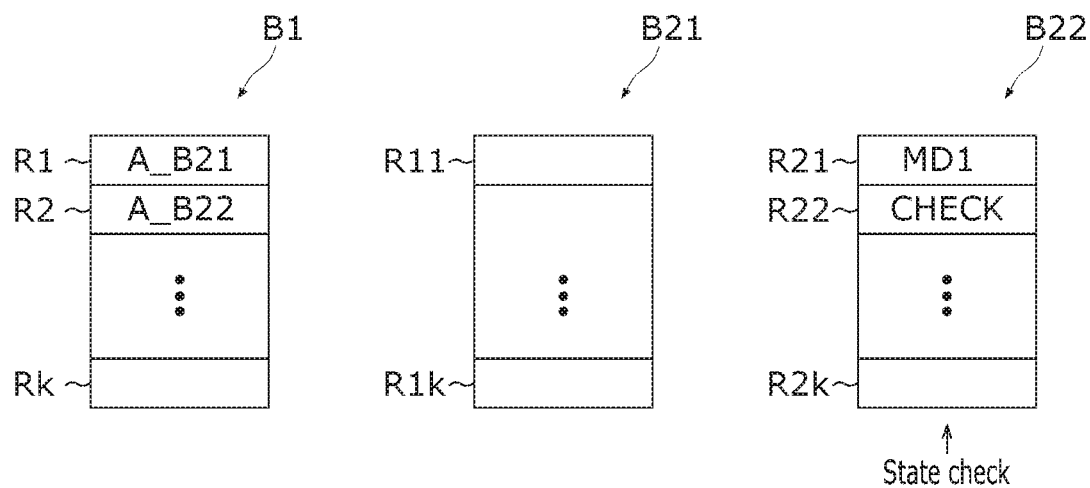
: Written
FIG. 6B
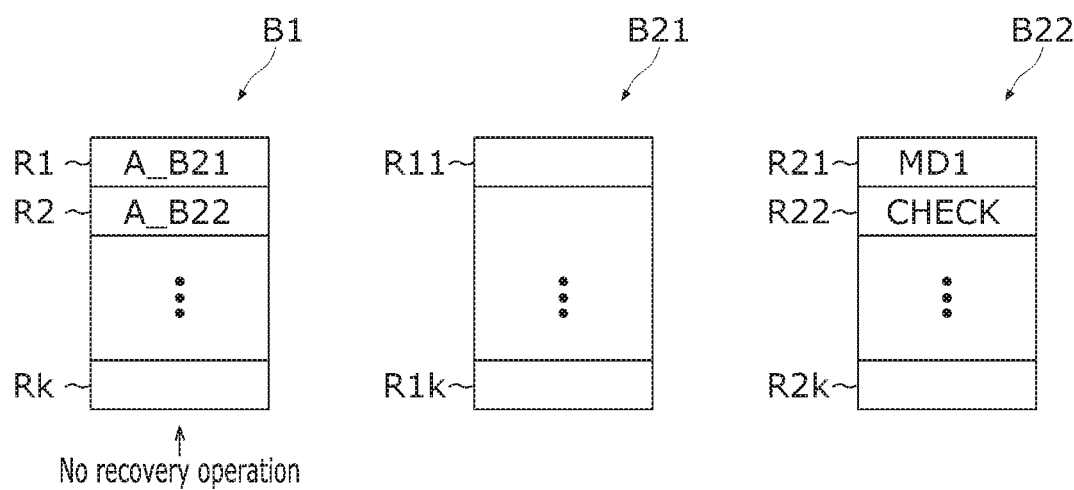
: Written

FIG. 7A
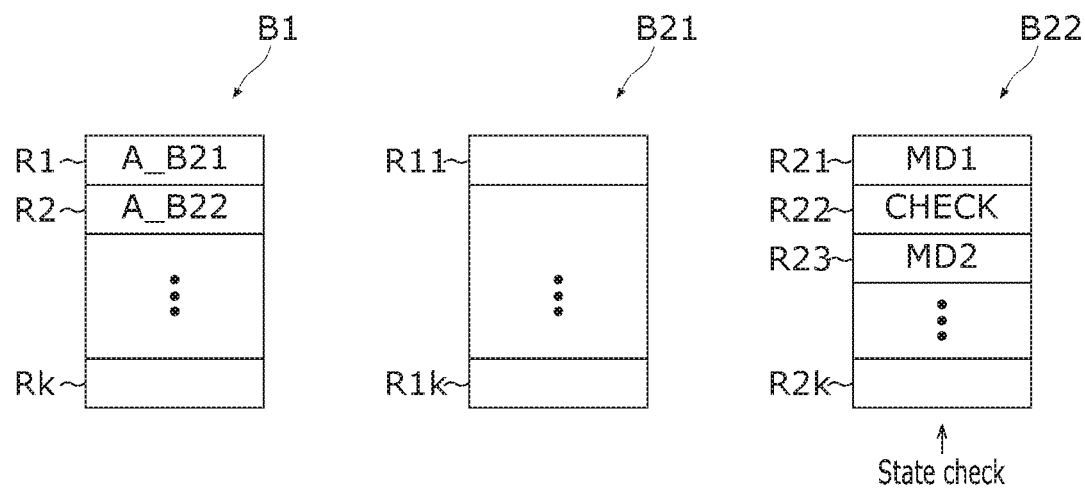
 : Written
FIG. 7B
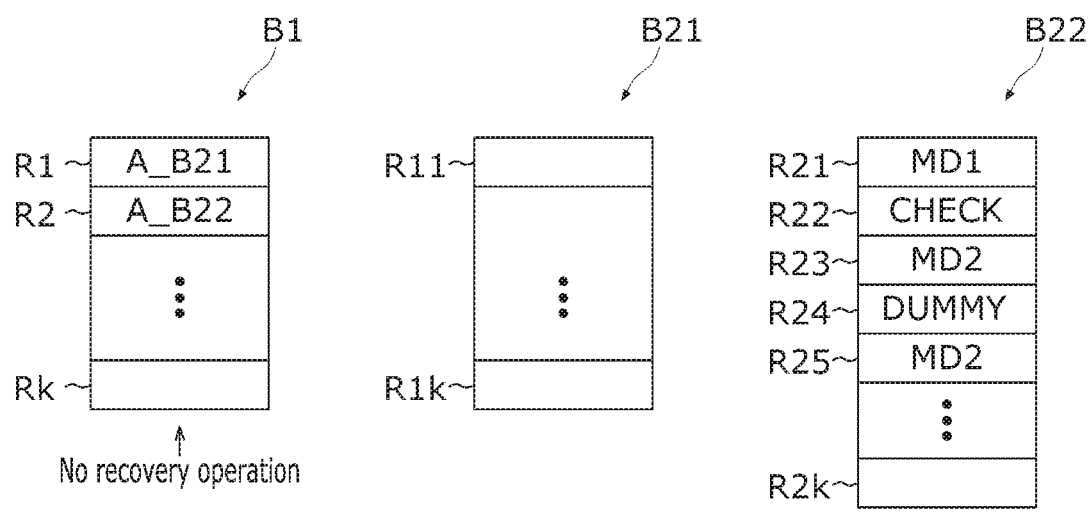
 : Written

FIG. 16

| Frequency | Sequential | Random |
|---|---|---|
| List scale | Ns | Nr |

( 1 ≤ Ns ≤ Nr ≤ Nsp )

FIG. 17

| Frequency | Sequential | | Random | |
|---|---|---|---|---|
| | Strong | Weak | Weak | Strong |
| List scale | Ns1 | Ns2 | Nr1 | Nr2 |

( 1 ≤ Ns1 ≤ Ns2 ≤ Nr1 ≤ Nr2 ≤ Nsp )

DATA STORAGE DEVICE AND OPERATING METHOD THEREOF

CROSS-REFERENCES TO RELATED APPLICATION

This application is a continuation-in-part application of U.S. patent application Ser. No. 15/785,586 filed on Oct. 17, 2017; U.S. patent application Ser. No. 15/829,227 filed on Dec. 1, 2017; and U.S. patent application Ser. No. 16/014,666 filed on Jun. 21, 2018. The disclosure of each of the above-identified applications is incorporated herein by reference in its entirety.

BACKGROUND

1. Technical Field

Various embodiments generally relate to a data storage device, and, more particularly, to a data storage device including a nonvolatile memory device.

2. Related Art

Data storage devices store data provided by an external device in response to a write request. Data storage devices may also provide stored data to an external device in response to a read request. Examples of external devices that use data storage devices include computers, digital cameras, cellular phones, and the like. Data storage devices may be embedded in an external device during manufacturing of the external devices or may be fabricated separately and then connected afterwards to an external device.

SUMMARY

In an embodiment, a data storage device may include: a nonvolatile memory device including a plurality of memory blocks; a controller configured to control the nonvolatile memory device; a plurality of management blocks including first and second management blocks managed by the controller, the second management block storing start data and then storing integrity data, the first management block storing a storage location of the second management block; and an integrity checker configured to check integrity of data associated with the first and second management blocks.

In an embodiment, a data storage device may include: a nonvolatile memory device including a plurality of management blocks including a first management block, a second management block and two backup management blocks for backup the second management block; and a controller. The controller is configured to: control the second management block to store management data in a first region; control the first management block to store location data regarding a storage location of the second management block; control the second management block to store integrity check data associated with the location data, in a second region subsequent to the first region; and selectively perform a recovery operation to the first and second management blocks by checking a state of the second management block corresponding to the location data in the first management block.

In an embodiment, a data storage device may include: a nonvolatile memory device including first and second management blocks and a plurality of data blocks; and a controller. The controller is configured to: control the second management bock to store management data; control the first management block to store location data regarding a storage location of the second management block; check integrity of the location data to generate integrity check data in response to a request from a host; and control a select data block among the plurality of data blocks to store the integrity check data.

BRIEF DESCRIPTION OF THE DRAWINGS

The above and other features and advantages of the present invention will become more apparent to those skilled in the art to which the present invention belongs by describing various embodiments thereof with reference to the attached drawings.

FIG. 3 is a diagram illustrating a method for a block designation unit of FIG. 1 to perform a level 2 designation operation.

FIGS. 6A and 6B are diagrams illustrating a method for the recovery unit of FIG. 1 to perform a recovery operation depending on the state of a current level 2 management block.

FIGS. 7A and 7B are diagrams illustrating a method for a recovery unit of FIG. 1 to perform a recovery operation depending on the state of a current level 2 management block.

FIG. 16 is a diagram illustrating a method for determining a list size based on the workload of the memory system.

FIG. 17 is a diagram illustrating a method for determining a list size based on the workload of the memory system.

DETAILED DESCRIPTION

Figure 1:
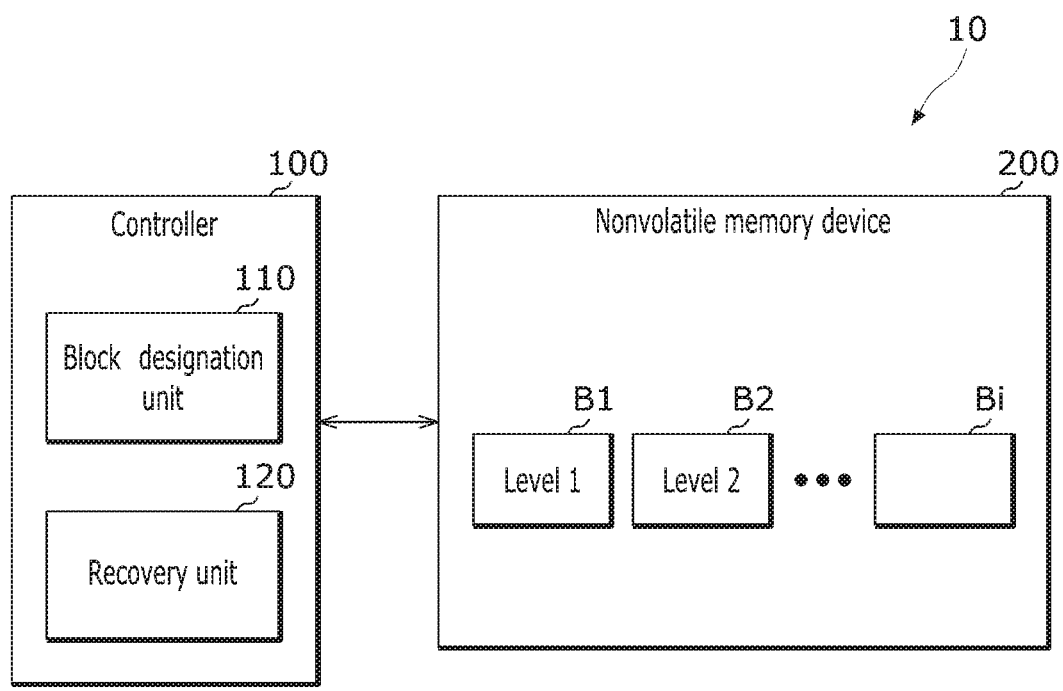
FIG. 1 is a block diagram illustrating an example of a data storage device in accordance with an embodiment of the present disclosure.

Hereinafter, a data storage device and an operating method thereof according to the present invention are described with reference to the accompanying drawings through various embodiments of the present invention. The present invention may, however, be embodied in different forms and should not be construed as being limited to the embodiments set forth herein. Rather, these embodiments are provided to describe the present invention in detail to the extent that a person skilled in the art to which the invention pertains is able to practice the present invention. Also, throughout the specification, reference to "an embodiment," "another embodiment" or the like is not necessarily to only one embodiment, and different references to any such phrase are not necessarily to the same embodiment(s).

It is to be understood that embodiments of the present invention are not limited to the particulars shown in the drawings, that the drawings are not necessarily to scale, and, in some instances, proportions may have been exaggerated in order to more clearly depict certain features of the invention. While particular terminology is used, it is to be appreciated that the terminology used is for describing particular embodiments only and is not intended to limit the scope of the present invention.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The phrase "at least one of . . . and . . . ," when used herein with a list of items, means a single item from the list or any combination of items in the list. For example, "at least one of A, B, and C" means, only A, or only B, or only C, or any combination of A, B, and C.

The term "or" as used herein means either one of two or more alternatives but not both nor any combinations thereof.

As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, an element also referred to as a feature described in connection with one embodiment may be used singly or in combination with other elements of another embodiment, unless specifically indicated otherwise.

Hereinafter, the various embodiments of the present disclosure are described in detail below with reference to the attached drawings.

FIG. 1 is a block diagram illustrating an example of a data storage device 10 in accordance with an embodiment of the present disclosure.

The data storage device 10 may store data provided from an external device, in response to a write request from the external device. Also, the data storage device 10 may be configured to provide stored data to the external device, in response to a read request from the external device.

The data storage device 10 may be configured by a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid State Drive (SSD), and the like.

The data storage device 10 may include a controller 100 and a nonvolatile memory device 200.

The controller 100 may control general operations of the data storage device 10. The controller 100 may store data in the nonvolatile memory device 200 by controlling the nonvolatile memory device 200.

The controller 100 may control the operations of the data storage device 10 based on various management data. The management data may be newly generated or updated while the data storage device 10 operates. The controller 100 may store the management data in a memory block B2 of the nonvolatile memory device 200, which is designated as a level 2 management block. The controller 100 may read and use the management data in case of necessity such as booting. The controller 100 may store the location of the level 2 management block B2 in a memory block B1, which is designated as a level 1 management block. The controller 100 may refer to the location stored in the level 1 management block B1, when it is necessary to access the level 2 management block B2.

The controller 100 may include a block designation unit 110 and a recovery unit 120.

The block designation unit 110 may designate, as the level 2 management block, any one empty memory block B2, among memory blocks B1 to Bi included in the nonvolatile memory device 200. When a previously designated level 2 management block no longer has an empty region to store management data, the block designation unit 110 may designate a new level 2 management block B2.

The block designation unit 110 may perform a level 2 designation operation, designating the level 2 management block B2, according to set processes. First, the block designation unit 110 may store start data in the new level 2 management block B2. The start data may be management data that is initially stored in the level 2 management block B2. After storing the start data, the block designation unit 110 may store the location of the level 2 management block B2 in the level 1 management block B1. After storing the location of the level 2 management block B2, the block designation unit 110 may store integrity check data in the level 2 management block B2. When the integrity check data has been stored in the level 2 management block B2, the level 2 designation operation is completed, and thereafter, the level 2 management block B2 may be used for storing management data.

When the level 1 management block B1 no longer has an empty region to store location data, the block designation unit 110 may designate, as a new level 1 management block, any one empty memory block, among the memory blocks B1 to Bi.

The recovery unit 120 may determine a current level 2 management block B2 based on the location data stored in the level 1 management block B1 and perform a recovery operation to the level 1 management block B1 and the level 2 management block B2, when a sudden power-off occurs. In detail, in a booting operation after a sudden power-off occurs, the recovery unit 120 may selectively perform the recovery operation to the level 1 management block B1 and the level 2 management block B2, depending on the state of the current level 2 management block B2. The state of the current level 2 management block B2 may represent the progress of the above-described level 2 designation operation. That is to say, which process the block designation unit 110 was performing in the above-described level 2 designation operation when the sudden power-off occurs may be estimated from the start data and the integrity check data stored in the current level 2 management block B2. Thus, unstable data may be detected therefrom, and the recovery operation may be selectively performed on the unstable data. As a result, according to the present embodiment, the recovery unit 120 may suppress the wear of a memory and quickly complete a booting operation, by skipping unnecessary recovery operation. A detailed operation method of the recovery unit 120 will be described later.

The nonvolatile memory device 200 may store data transmitted from the controller 100, read out stored data, and transmit read-out data to the controller 100, according to control of the controller 100.

The nonvolatile memory device 200 may include the plurality of memory blocks B1 to Bi. Memory block may be a unit by which the nonvolatile memory device 200 performs an erase operation. In other words, the nonvolatile memory device 200 may erase simultaneously data stored in a certain memory block, through an erase operation.

The nonvolatile memory device 200 may include a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

While it is illustrated in FIG. 1 that the data storage device 10 includes one nonvolatile memory device 200, it is to be noted that the present disclosure is not limited thereto and the data storage device 10 may include two or more nonvolatile memory devices according to various embodiments of the present disclosure. When the data storage device 10 includes two or more nonvolatile memory devices, a level 1 management block and a level 2 management block may be provided in different nonvolatile memory devices.

Figure 2:
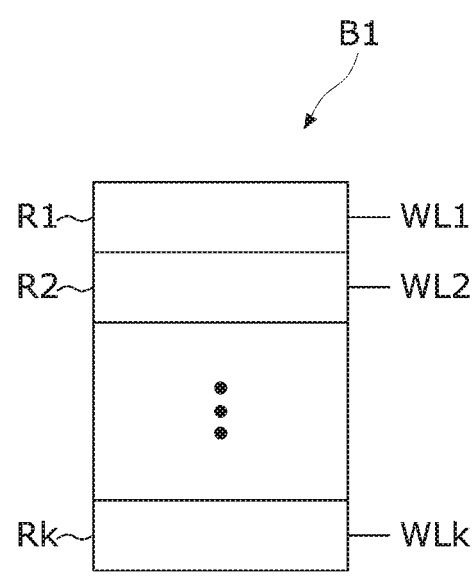
FIG. 2 is a diagram illustrating a structure of a memory block of a nonvolatile memory device.

FIG. 2 is a diagram to assist in the explanation of the structure of the memory block B1 of the nonvolatile memory device 200. The memory blocks B2 to Bi shown in FIG. 1 may be configured in the same way as the memory block B1.

Referring to FIG. 2, the memory block B1 may include a plurality of regions R1 to Rk respectively corresponding to word lines WL1 to WLk. The regions R1 to Rk may be accessed when corresponding word lines are selected. Namely, in the regions R1 to Rk, write operations and read operations may be performed when corresponding word lines are selected. Each of the regions R1 to Rk may include a plurality of memory cells, which are coupled to a corresponding word line. Memory cells included in a single region may be simultaneously accessed as a corresponding word line is selected.

The regions R1 to Rk may be used to store data according to a set write sequence. The write sequence may be, for example, a sequence from the region R1 to the region Rk.

FIG. 3 is a diagram describing a method for the block designation unit 110 of FIG. 1 to perform the level 2 designation operation. FIG. 3 illustrates a level 1 management block B1, a previously designated level 2 management block B21, and a newly designated level 2 management block B22.

Referring to FIG. 3, when all of level 2 regions R11 to R1k included in the current level 2 management block B21 are used, that is, when the current level 2 management block B21 no longer has an empty level 2 region to store management data, the block designation unit 110 may designate the new level 2 management block B22.

When designating the new level 2 management block B22, the block designation unit 110 may store start data MD1 in a level 2 region R21 of the new level 2 management block B22 at step S11. The level 2 region R21 may precede (i.e. first in order) in a write sequence among level 2 regions R21 to R2k included in the new level 2 management block B22. The start data MD1 may be management data that is stored first in the level 2 management block B22. The size of the start data MD1 is not limited to any particular size; MD1 may be of any suitable size. However, it is assumed in the following description, by way of example, that the size of the start data MD1 corresponds to a single level 2 region.

At step S12, the block designation unit 110 may store a location A_B22 of the level 2 management block B22 in the level 1 region R2 among the level 1 regions R1 to Rk included in the level 1 management block B1. The location A_B22 of the level 2 management block B22 may be stored in the level 1 management block B1 in a section or portion of B1 adjacent to or following the section or portion of B1 where location A_B21 of the current level 2 management block B21 is stored. The size of location data such as the location A_B22 of the level 2 management block B22 is not limited to any particular size; location data may be of any suitable size. However, it is assumed in the following description, by way of example, that the size of location data to be newly stored corresponds to a single level 1 region.

At step S13, the block designation unit 110 may store integrity check data CHECK in the level 2 region R22 of the level 2 management block B22. The level 2 region R22 in which the integrity check data CHECK is stored may follow the level 2 region R21 in which the start data MD1 is stored, according to the write sequence. The integrity check data CHECK may include, for example, dummy data. The size of the integrity check data CHECK is not limited to any particular size; CHECK may be of any suitable size. However, it is assumed in the following description, by way of example, that the size of the integrity check data CHECK corresponds to a single level 2 region. The block designation unit 110 may complete the level 2 designation operation by storing the integrity check data CHECK. The level 2 management block B22 may be used for storing management data, until it does not include an empty level 2 region to store management data.

Figure 4A:
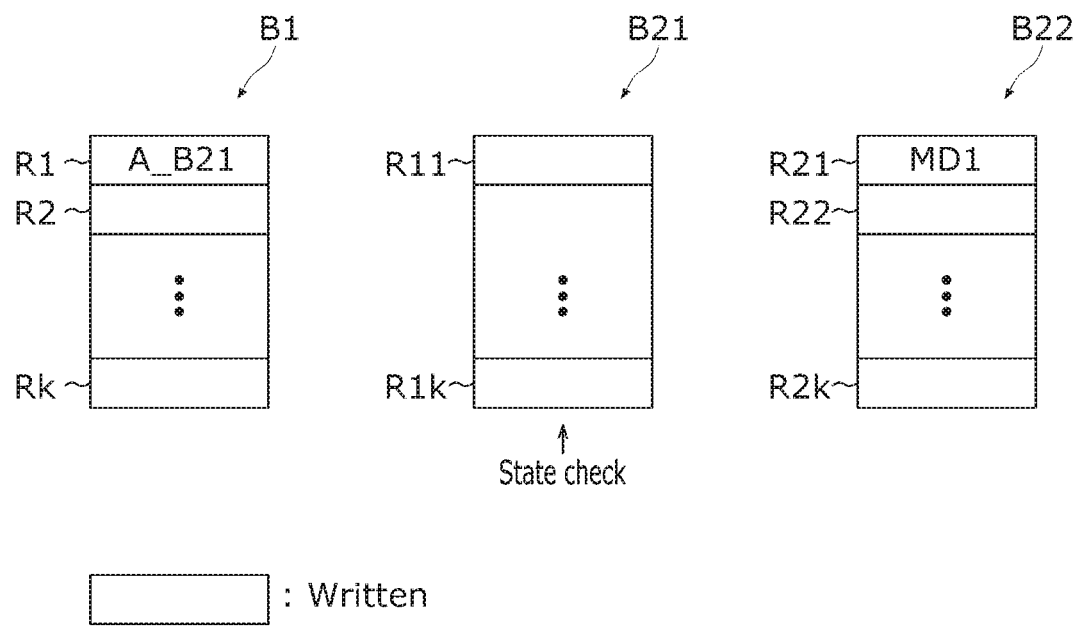
FIGS. 4A and 4B are diagrams illustrating a method for the recovery unit of FIG. 1 to perform a recovery operation depending on the state of a current level 2 management block.
Figure 4B:
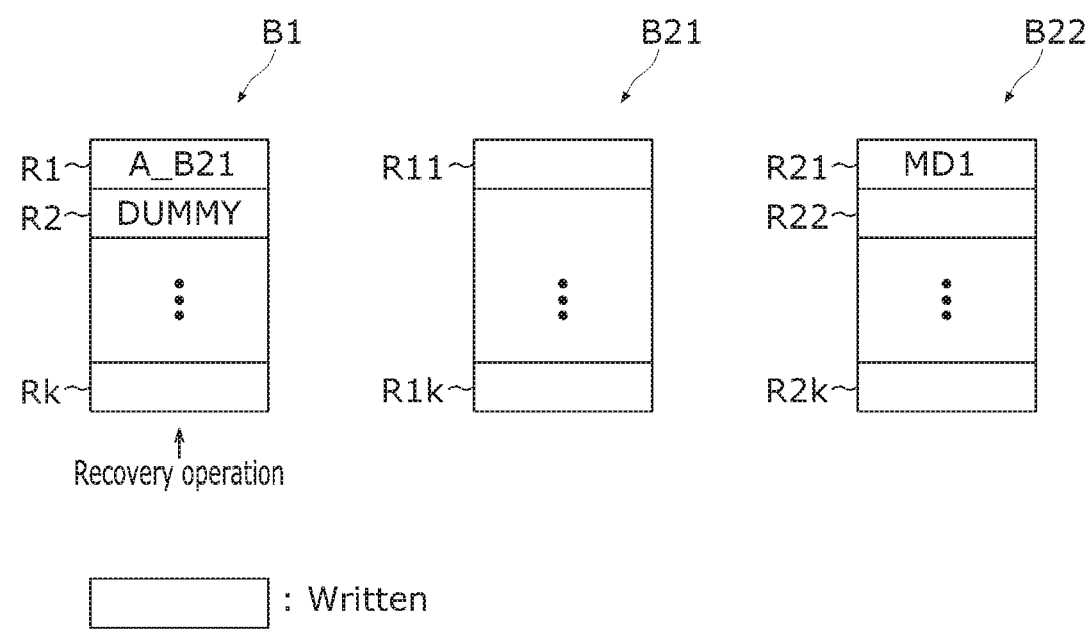

FIGS. 4A and 4B are diagrams describing a method for the recovery unit 120 of FIG. 1 to perform a recovery operation depending on the state of a current level 2 management block B21. FIGS. 4A and 4B describe the recovery operation when the current level 2 management block B21 no longer has an empty level 2 region to store management data.

Referring to FIG. 4A, first, the current level 2 management block B21 may be determined based on a particular location (i.e., a last location) A_B21 stored last in the level 1 management block B1. The recovery unit 120 may check the state of the current level 2 management block B21, and determine that the current level 2 management block B21 does not have an empty level 2 region to store management data. That is to say, even when a new level 2 management block B22 is designated at a time of sudden power off, the recovery unit 120 may check the state of the level 2 management block B21 based on the final location A_B21 of the level 1 management block B1.

FIG. 4A illustrates the case where the new level 2 management block B22 has been designated and start data MD1 is being stored in the level 2 region R21 of the new level 2 management block B22 at a time of a sudden power off.

Also, FIG. 4A illustrates the case where start data MD1 is stored in the level 2 region R21, but the location of the new level 2 management block B22 is not yet stored in the level 1 management block B1 at a time of a sudden power off.

Moreover, FIG. 4A illustrates the case where start data MD1 is stored in the level 2 region R21 and the location of the new level 2 management block B22 is being stored in the level 1 region R2 of the level 1 management block B1 at a time of a sudden power off. In this case, the location A_B21 of the current level 2 management block B21 may be determined as a last location and the location of the new level 2 management block B22 may be unstable data in the level 1 region R2 of the level 1 management block B1. Therefore, appropriate measures should be taken such that the level 1 region R2 is not used again.

Therefore, referring to FIG. 4B, the recovery unit 120 may perform the recovery operation by performing a dummy write operation to the level 1 region R2 following, according to the write sequence, the level 1 region R1 in which the last location A_B21 is stored, in the level 1 management block B1. In other words, the recovery unit 120 may process the level 1 region R2 such that the level 1 region R2 is no longer used, by storing dummy data DUMMY in the level 1 region R2 which may be in an unstable state. The block designation unit 110 may perform the level 2 designation operation by designating a new level 2 management block instead of the level 2 management block B22.

Figure 5A:
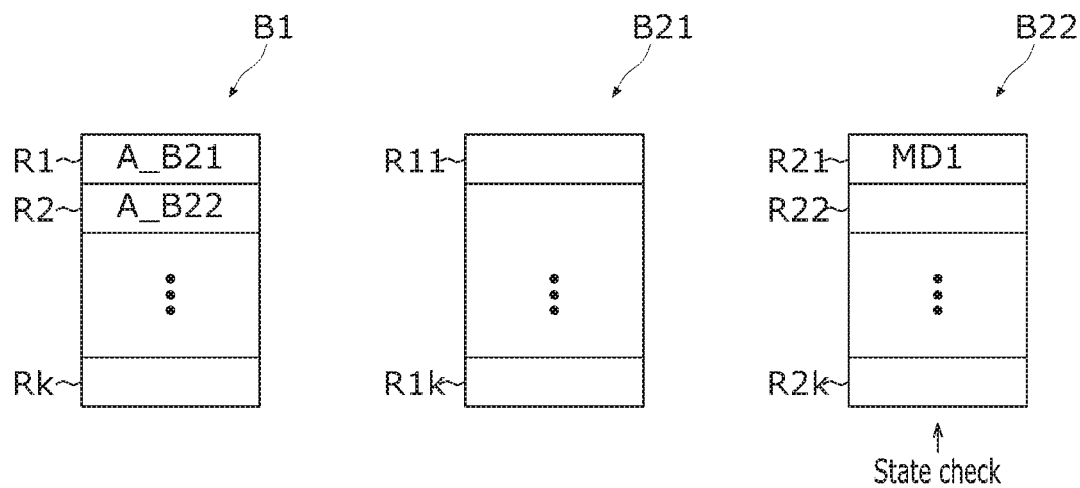
FIGS. 5A and 5B are diagrams illustrating a method for the recovery unit of FIG. 1 to perform a recovery operation depending on the state of a current level 2 management block.
Figure 5B:
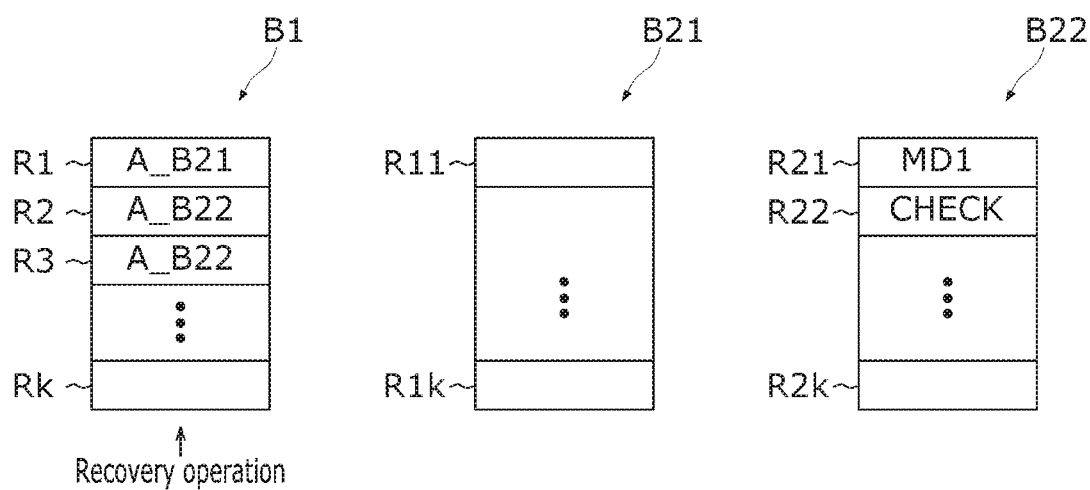

FIGS. 5A and 5B are diagrams describing a method for the recovery unit 120 of FIG. 1 to perform a recovery operation depending on the state of a current level 2 management block B22. FIGS. 5A and 5B describe the recovery operation when the current level 2 management block B22 retains only start data MD1.

Referring to FIG. 5A, as described above, the recovery unit 120 may detect the current level 2 management block B22 based on a last location A_B22, which is stored in the level 1 management block B1. The recovery unit 120 may check the state of the current level 2 management block B22, and determine that the level 2 management block B22 retains only the start data MD1. Whether the level 2 management block B22 retains only the start data MD1 may be determined by identifying the data read from the level 2 management block B22.

FIG. 5A illustrates the case where the start data MD1 is stored in the new level 2 management block B22, the location A_B22 of the level 2 management block B22 is stored in the level 1 region R2 of the level 1 management block B1, and integrity check data is not stored in the level 2 region R22 following the start data MD1 at a time of a sudden power off.

Also, FIG. 5A illustrates the case where the location A_B22 of the new level 2 management block B22 is being stored in the level 1 region R2 of the level 1 management block B1 at a time of a sudden power off. In this case, even though the location A_B22 is sufficiently stored to be identified as the last location, the last location A_B22 stored in the level 1 region R2 may be in an unstable state since the location A_B22 is being stored at a time of a sudden power off.

Therefore, referring to FIG. 5B, the recovery unit 120 may perform the recovery operation by performing a copy operation of the last location A_B22 for the level 1 region R3 following, according to the write sequence, the level 1 region R2 in which the last location A_B22 is stored, in the level 1 management block B1. Namely, the recovery unit 120 may stably store again the last location A_B22 in the level 1 region R3.

The block designation unit 110 may store integrity check data CHECK, which is not stored in the level 2 management block B22 due to the sudden power-off, in the level 2 region R22 following the start data MD1. While there is a possibility that the level 2 region R22 is also unstable due to the sudden power-off, such a situation does not raise an issue as the integrity check data CHECK is configured by dummy data.

FIGS. 6A and 6B are diagrams describing a method for the recovery unit 120 of FIG. 1 to perform a recovery operation depending on the state of a current level 2 management block B22. FIGS. 6A and 6B describe the recovery operation when the current level 2 management block B22 retains only start data MD1 and integrity check data CHECK.

Referring to FIG. 6A, as described above, the recovery unit 120 may determine the current level 2 management block B22 based on a last location A_B22 which is stored in the level 1 management block B1. The recovery unit 120 may check the state of the current level 2 management block B22, and determine that the level 2 management block B22 retains only the start data MD1 and the integrity check data CHECK. Whether the level 2 management block B22 retains only the start data MD1 and the integrity check data CHECK may be determined by identifying the data read from the level 2 management block B22.

FIG. 6A illustrates the case where the start data MD1 is stored in the new level 2 management block B22, the location A_B22 of the level 2 management block B22 is stored in the level 1 region R2 of the level 1 management block B1, and the integrity check data CHECK is stored in the level 2 management block B22 at a time of a sudden power off. That is, the level 2 designation operation to the level 2 management block B22 is completed at a time of a sudden power off, and in this case, unstable data may not exist in the level 1 management block B1 and the level 2 management block B22.

Hence, referring to FIG. 6B, the recovery unit 120 may skip the recovery operation to the level 1 management block B1.

FIGS. 7A and 7B are diagrams describing a method for the recovery unit 120 of FIG. 1 to perform a recovery operation depending on the state of a current level 2 management block B22. FIGS. 7A and 7B describe the recovery operation when the current level 2 management block B22 retains start data MD1 and integrity check data CHECK and has at least one empty level 2 region to store management data.

Referring to FIG. 7A, as described above, the recovery unit 120 may determine the current level 2 management block B22 based on a last location A_B22, which is stored in the level 1 management block B1. The recovery unit 120 may check the state of the current level 2 management block B22, and determine that the level 2 management block B22 not only includes the start data MD1 and the integrity check data CHECK, but also includes management data MD2 that is stored subsequently. Further, the recovery unit 120 may determine that the level 2 management block B22 has at least one empty level 2 region to store management data.

FIG. 7A illustrates the case where the level 2 designation operation to the level 2 management block B22 is completed at a time of a sudden power off. In this case, unstable data may not exist in the level 1 management block B1 and the level 2 management block B22.

Hence, referring to FIG. 7B, the recovery unit 120 may skip the recovery operation to the level 1 management block B1.

According to an embodiment, the recovery unit 120 may perform the recovery operation to the level 2 management block B22 when management data MD2 is being stored in the level 2 region R23 of the level 2 management block B22 at a time of a sudden power off. In this case, the level 2 region R23 and the following level 2 region R24 may become unstable and thus the recovery unit 120 may prevent the level 2 region R24 from being used, by performing a dummy write operation to the level 2 region R24 following, according to the write sequence, the level 2 region R23 in which the last management data MD2 is being stored, in the level 2 management block B22. In addition, the recovery unit 120 may stably store again the management data MD2 that may be unstable, by performing a copy operation of the management data MD2 for the level 2 region R25 following, according to the write sequence, the level 2 region R24, in the level 2 management block B22.

Figure 8:
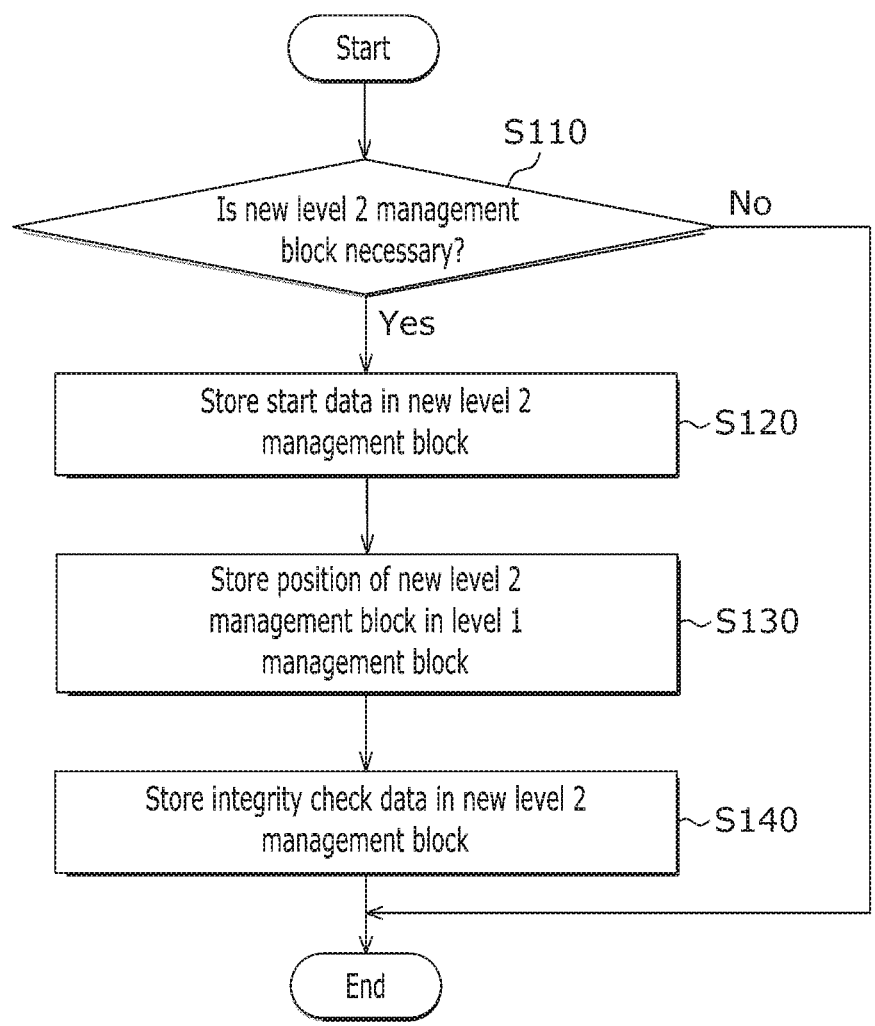
FIG. 8 is a flow chart illustrating a method for the block designation unit of FIG. 1 to perform a level 2 designation operation.

FIG. 8 is a flow chart describing a method for the block designation unit 110 of FIG. 1 to perform a level 2 designation operation.

Referring to FIG. 8, at step S110, the block designation unit 110 may determine whether a new level 2 management block is needed. That is, when a current level 2 management block no longer has an empty level 2 region to store management data, the block designation unit 110 may determine that a new level 2 management block is needed. When a new level 2 management block is not needed, the process may end. When a new level 2 management block is needed, the process may proceed to step S120.

At the step S120, when the block designation unit 110 determines that a new level 2 management block is needed, the block designation unit 110 may designate a new level 2 management block B2, and store start data MD1 in the new level 2 management block B2. The start data MD1 may be management data that is stored first in the level 2 management block B2.

At step S130, the block designation unit 110 may store the location of the new level 2 management block B2 in the level 1 management block B1. The location of the new level 2 management block B2 may be stored in the level 1 management block B1 following the location of the current level 2 management block.

At step S140, the block designation unit 110 may store integrity check data in the new level 2 management block B2. By storing the integrity check data, the block designation unit 110 may complete the level 2 designation operation.

Figure 9:
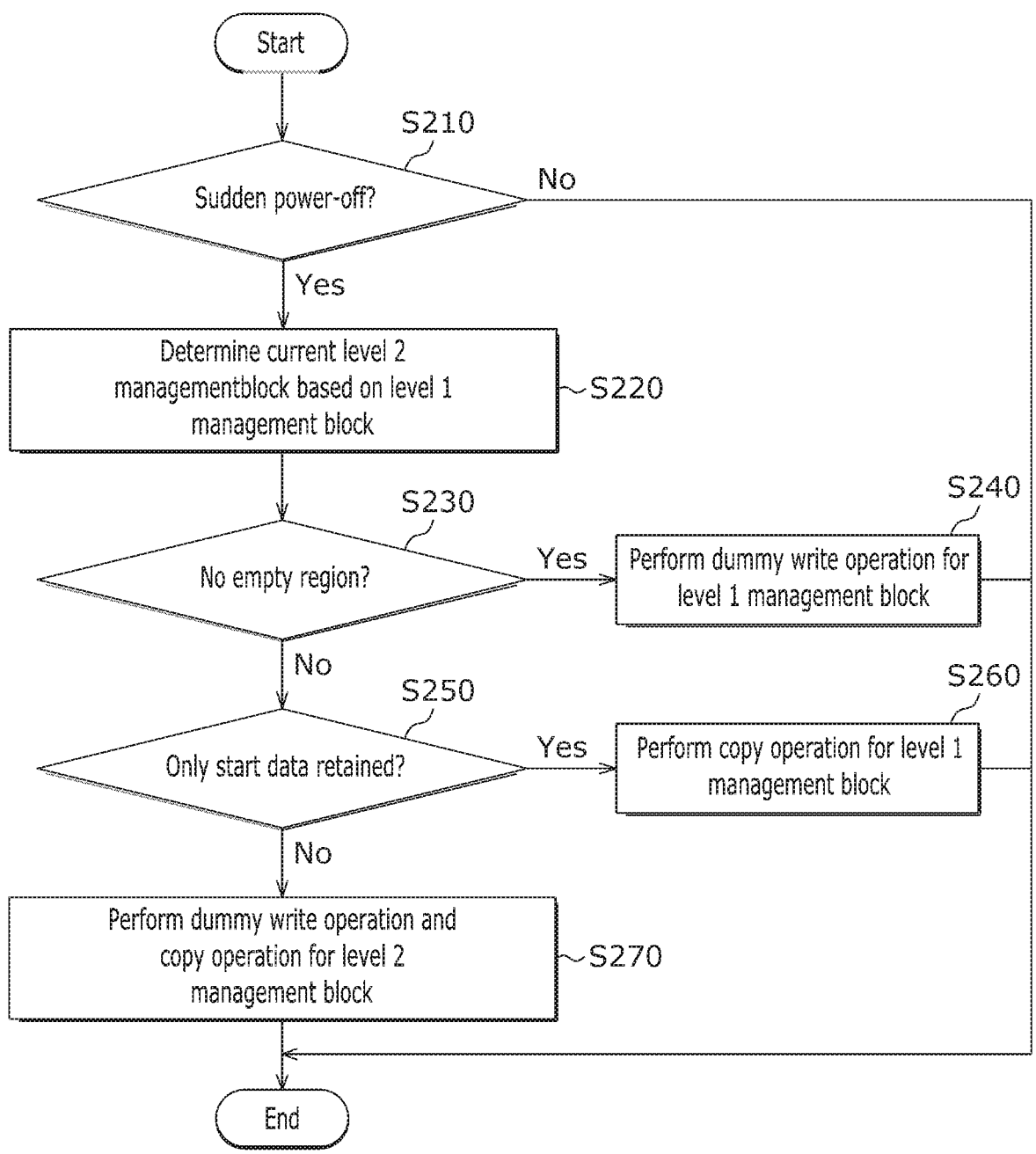
FIG. 9 is a flow illustrating a method for the recovery unit of FIG. 1 to perform a recovery operation.

FIG. 9 is a flow chart describing a method for the recovery unit 120 of FIG. 1 to perform a recovery operation.

Referring to FIG. 9, at step S210, the recovery unit 120 may determine whether a sudden power-off has occurred before a power-on. In the case where a sudden power-off has not occurred, the process may be ended. In the case where a sudden power-off has occurred, the process may proceed to step S220.

At the step S220, if the recovery unit 12 determines that a sudden power-off has occurred, the recovery unit 120 may determine a current level 2 management block B2 based on a last location which is stored in the level 1 management block B1.

At step S230, the recovery unit 120 may determine whether the current level 2 management block B2 does not have an empty level 2 region to store management data. When the current level 2 management block B2 has an empty level 2 region to store management data ("No" at step S230), the process may proceed to step S250. When the current level 2 management block B2 does not have an empty level 2 region to store management data ("Yes" at step S230), the process may proceed to step S240.

At the step S240, the recovery unit 120 may perform a dummy write operation to the level 1 management block B1. In detail, the recovery unit 120 may perform the dummy write operation to a level 1 region following, according to a write sequence, a level 1 region in which the last location is stored, in the level 1 management block B1. Thereafter, the recovery operation may be ended.

At the step S250, the recovery unit 120 may determine whether the current level 2 management block B2 retains only start data. When the current level 2 management block B2 does not retain only start data, that is, when the current level 2 management block B2 retains start data and integrity check data, the process may proceed to S270. When the current level 2 management block B2 retains only start data, the process may proceed to step S260.

At the step S260, the recovery unit 120 may perform a copy operation to the level 1 management block B1. In detail, the recovery unit 120 may perform the copy operation of the last location for a level 1 region following, according to the write sequence, the level 1 region in which the last location is stored, in the level 1 management block B1. Thereafter, the recovery operation may be ended.

At the step S270, the recovery unit 120 may perform a dummy write operation and a copy operation to the level 2 management block B2. In detail, the recovery unit 120 may perform the dummy write operation to a level 2 region following a level 2 region in which last management data is stored, in the level 2 management block B2. Then, the recovery unit 120 may perform the copy operation of a last location for a level 2 region following the level 2 region for which the dummy write operation is performed. The recovery unit 120 may skip a recovery operation to the level 1 management block B1. In other words, since a level 2 designation operation is completed at a time of a sudden power off, the recovery unit 120 may skip the recovery operation to the level 1 management block B1. Thereafter, the recovery operation may be ended.

Figure 10:
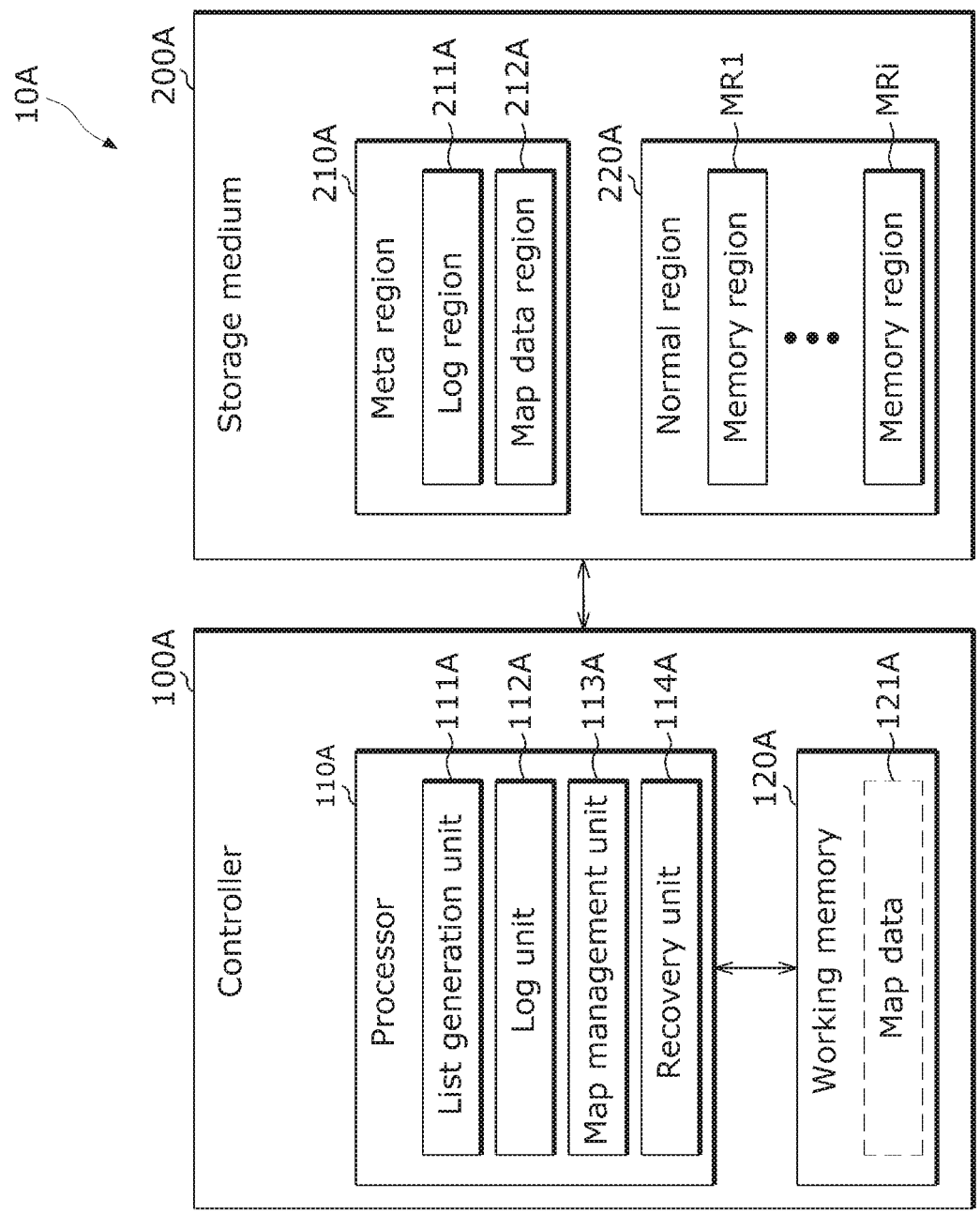
FIG. 10 is a block diagram illustrating a memory system in accordance with an embodiment of the present invention.

FIG. 10 is a block diagram illustrating a memory system 10A in accordance with an embodiment of the present invention.

The memory system 10A may be employed as a data storage device for storing data for any suitable electronic device. The memory system 10A may be configured to store data provided from an external device which is operatively coupled with the memory system 10A, in response to a write request received from the external device. Also, the memory system 10A may be configured to provide stored data to the external device, in response to a read request received from the external device.

For example, the memory system 10A may be operatively coupled to or configured as a Personal Computer Memory Card International Association (PCMCIA) card, a Compact Flash (CF) card, a smart media card, a memory stick, various multimedia cards (MMC, eMMC, RS-MMC, and MMC-Micro), various secure digital cards (SD, Mini-SD, and Micro-SD), a Universal Flash Storage (UFS), a Solid-State Drive (SSD) and the like.

The memory system 10A may include a controller 100A and a storage medium 200A. The controller 100A may include a processor 110A and a working memory 120A. The controller 100A may control the operation of the memory system 10A, such as for example, foreground and/or background operations of the memory system. The foreground and background operations may also be referred to herein as general operations. Foreground operations may include, for example, read and write operations, while background operations may include refresh, wear leveling, map update, garbage collection operations. In an embodiment, the controller 100A may control all of the general operations of the memory system 10A, however, the present invention is not limited in this way.

The processor 110A may control one or more operations of the controller 100A. For example, the processor 110A may control the storing of data in memory regions MR1 to MRi of a normal region 220A included in the storage medium 200A in response to a write request received from an external device, and may read out data stored in the memory regions MR1 to MRi and output the read-out data to the external device in response to a read request received from the external device.

According to an embodiment, the processor 110A may first access all of one or more first memory regions for storing data. The first memory regions may be included in a first memory region list. The first memory list may include one or more first memory regions that are suitable for storing data for a first purpose. Then, after accessing all of the one or more first memory regions and upon completing the data storing in all of the one or more first memory regions, the processor 110A may update the map data for the first memory regions and determine a list size based on the workload of the memory system 10A. The processor 110A may then generate a second memory region list including one or more second memory regions that are suitable for storing data for a first purpose according to the newly determined list size. After the update of the map data for the first memory regions, the processor 110A may access the second memory regions for storing data.

According to an embodiment, the processor 110A may determine a list size based on the workload of the memory system 10A, generate a memory region list including one or more memory regions according to the list size, log the memory region list before accessing the memory regions included in the memory region list for a purpose of data storage, and update map data for the memory regions after accessing all of the memory regions for a purpose of data storage.

According to an embodiment, the processor 110A may log a first memory region list before accessing one or more first memory regions included in the first memory region list for a purpose of data storage, may update the map data for the first memory regions after accessing all of the first memory regions for a purpose of data storage, and log a second memory region list before accessing one or more second memory regions included in the second memory region list for a purpose of data storage. The logging of the second memory region list may follow the update of the map data for the first memory regions. The size of the first and second memory region lists may be based on the workload of the memory system 10A, and may be different as the workload may change. Hence, the size of the first memory region list may be based on a first workload of the memory system 10A calculated before logging the first memory region list, whereas the size of the second memory region list may be based on a second workload of the memory system 10A calculated after the update of the map data for the first memory regions and before logging the second memory region list.

The processor 110A may include a list generation unit 111A, a log unit 112A, a map management unit 113A, and a recovery unit 114A.

The list generation unit 111A may generate a memory region list. The memory region list may include one or more memory regions which are to be sequentially accessed for a purpose of data storage. The list generation unit 111A may generate a succeeding memory region list in advance before all of the memory regions included in a previous memory region list are accessed. Alternatively, the list generation unit 111A may generate a succeeding memory region list after all of the memory regions included in a previous memory region list are accessed. The list generation unit 111A may select memory regions to be included in a memory region list according to a wear leveling policy.

In particular, the list generation unit 111A may determine the number of memory regions (i.e., a list size) to be included in a memory region list based on the workload of the memory system 10A. Since performance of the memory system 10A and a recovery time after an abnormal power-off have a trade-off relationship with respect to a list size, the list generation unit 111A according to the present embodiment may determine a list size in consideration of these factors. Detailed descriptions therefor will be made with reference to FIGS. 15A to 17.

The log unit 112A may log a succeeding memory region list in a log region 211A when all of memory regions included in a previous memory region list are accessed and before memory regions included in the succeeding memory region list begin to be accessed. In detail, the log unit 112A may log the succeeding memory region list in the log region 211A only after map data 121A for the previous memory region list are updated by the map management unit 113A.

Also, each time a memory region is completely accessed, that is, each time a memory region is closed, the log unit 112A may log information on the closed memory region in the log region 211A. Logs of the log region 211A may be used in determining a recovery range when a recovery operation is performed after an abnormal power-off. The detailed operation of the log unit 112A is described with reference to FIG. 11.

The map management unit 113A may manage the map data 121A in which logical addresses and physical addresses are mapped. A logical address may be used by the external device to access the storage medium 200A, and a physical address may be an actual address of the storage medium 200A. Among the map data 121A, the map management unit 113A may map a logical address provided along with data from the external device and a physical address of the normal region 220A into which the provided data is written. When the external device requests a read data of a logical address provided along with the read request, the map management unit 113A may identify a physical address mapped to the provided logical address among the map data 121A, and read out data of the identified physical address and provide the read-out data to the external device.

The map management unit 113A may generate map data 121A corresponding to data each time the data is stored in the normal region 220A. That is to say, the map data 121A may be updated as data are being stored in the normal region 220A. Conversely, a map data region 212A of the storage medium 200A may be out of date. Accordingly, the map management unit 113A may update the out-of-date map data stored in the map data region 212A based on the up-to-date map data 121A. In detail, when all memory regions included in a certain memory region list are accessed, the map management unit 113A may reflect the up-to-date map data 121A for corresponding memory regions into the map data region 212A.

Even before map data 121A are reflected into the map data region 212A, the map data 121A may be stored in the normal region 220A together with corresponding data. As described below, when map data 121A are not reflected into the map data region 212A and thus are lost due to an abnormal power-off, the map data 121A may be recovered based on the map data 121A stored in the normal region 220A.

The recovery unit 114A may perform a recovery operation for an abnormal power-off. The recovery unit 114A may determine a recovery range by tracing logs stored in the log region 211A. The recovery operation of the recovery unit 114A may include a map data recovery operation to determine a loss range of map data and a data moving operation to determine a damage range of a memory region. Detailed description of the recovery operation of the recovery unit 114A provided with reference to FIGS. 14 and 18.

The working memory 120A may retain the map data 121A managed by the map management unit 113A. The up-to-date map data 121A may be copied in the map data region 212A at a set time as described above, that is, when all memory blocks included in a corresponding memory region list have been accessed.

The working memory 120A may be a volatile memory device such as a static random access memory (SRAM) and a dynamic random access memory (DRAM). A volatile memory device may lose data stored therein when a power-off occurs.

However, according to an embodiment, the working memory 120A may be a nonvolatile memory device such as a flash memory, such as a NAND flash or a NOR flash, a Ferroelectrics Random Access Memory (FeRAM), a Phase-Change Random Access Memory (PCRAM), a Magnetoresistive Random Access Memory (MRAM), a Resistive Random Access Memory (ReRAM), and the like.

Under the control of the controller 100A, the storage medium 200A may store data transmitted from the controller 100A and may read out stored data and transmit read-out data to the controller 100A. The storage medium 200A may include a meta region 210A and the normal region 220A.

The meta region 210A may store metadata including various operation data necessary for the operation of the memory system 10A. The meta region 210A may include the log region 211A where logs are stored by the log unit 112A and the map data region 212A where map data are stored by the map management unit 113A.

The normal region 220A may store normal data transmitted from the external device, which normal data is different than metadata which are stored in the meta region 210A. The normal region 220A may include the plurality of memory regions MR1 to MRi, and a memory region list may be generated for such memory regions MR1 to MRi of the normal region 220A.

The storage medium 200A may include one or more nonvolatile memory devices. Each of the memory regions MR1 to MRi included in the normal region 220A may exist over the one or more nonvolatile memory devices. For example, each memory region may include memory blocks which have the same address in the respective nonvolatile memory devices. A memory block may be a unit of an erase operation in a nonvolatile memory device. A memory block may comprise a plurality of pages each page comprising of memory cells coupled to the same word line.

Figure 11:
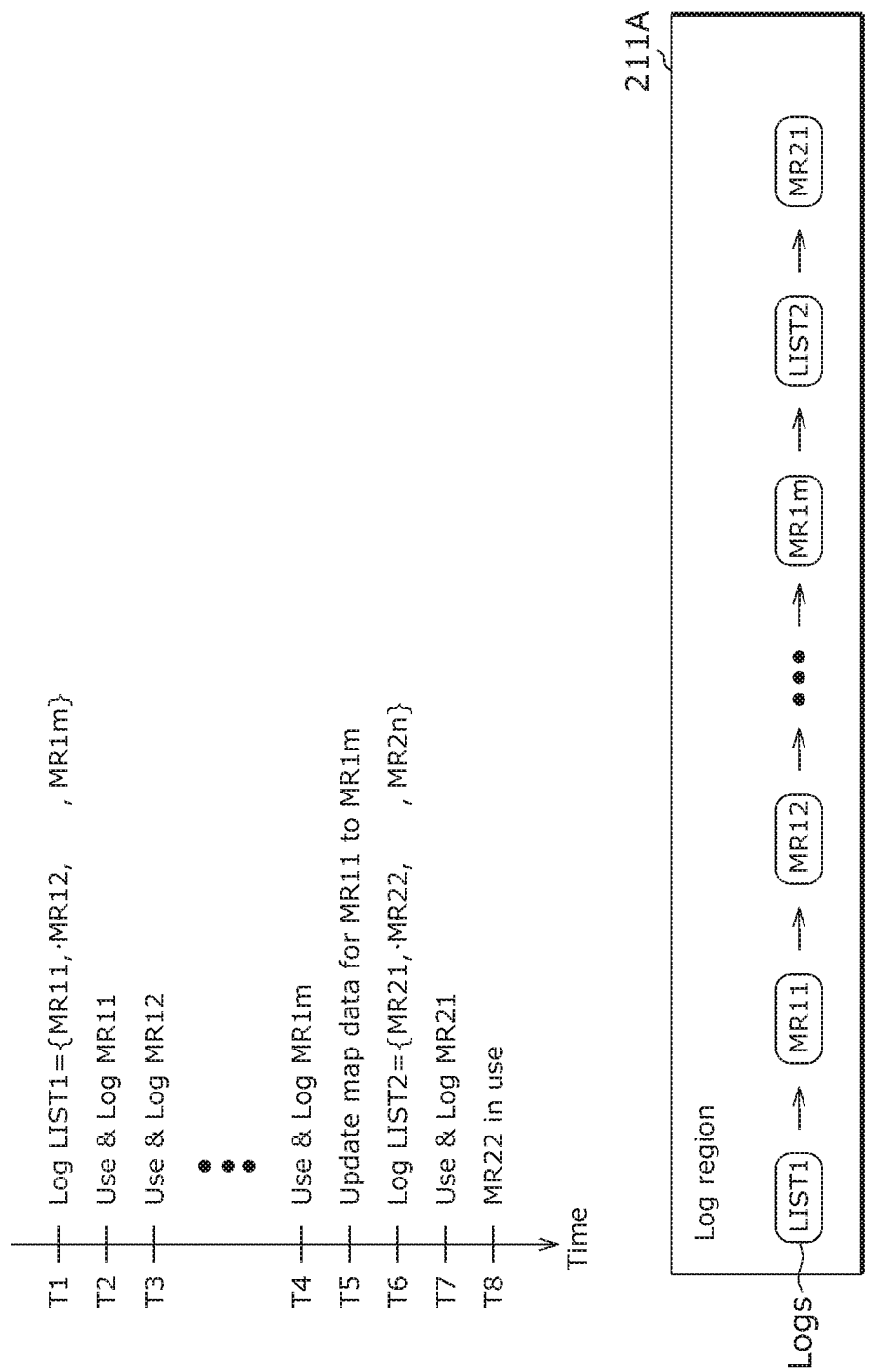
FIG. 11 is a diagram illustrating a method for operating the memory system shown in FIG. 10.

FIG. 11 is a diagram illustrating a method for operating the memory system 10 of FIG. 10. FIG. 11 illustrates a log process and a map data update process according to access to a first memory region list LIST1 and a second memory region list LIST2. In FIG. 11, processes of generating the first memory region list LIST1 and the second memory region list LIST2 are omitted.

First, at a time T1, the log unit 112A may log the first memory region list LIST1 in the log region 211A of the meta region 210A of the storage medium 200A. The first memory region list LIST1 may include memory regions MR11 to MR1m which are to be accessed sequentially. The size of the first memory region list LIST1, that is, the number of the memory regions MR11 to MR1m in the list, may be determined according to a method described below.

At a time T2, the memory region MR11 may be accessed according to an access sequence arranged in the first memory region list LIST1. When the memory region MR11 is closed, the log unit 112A may log information on the memory region MR11 in the log region 211A. The information on the memory region MR11 may be an address of the memory region MR11. A memory region is closed when it is fully written with data.

From a time T3 to a time T4, the memory regions MR12 to MR1m may be accessed sequentially according to the access sequence arranged in the first memory region list LIST1. Each time a memory region among the memory regions MR12 to MR1m is closed, the log unit 112A may log information on that closed memory region in the log region 211A.

At a time T5, when all of the memory regions MR11 to MR1m have been accessed, the map management unit 113A may update out-of-date map data stored in the map data region 212A based on up-to-date map data 121A for the memory regions MR11 to MR1m stored in the working memory 120A.

At a time T6, the log unit 112A may log the second memory region list LIST2 in the log region 211A. The second memory region list LIST2 may include memory regions MR21 to MR2n to be accessed sequentially. The list size of the second memory region list LIST2, that is, the number of the memory regions MR21 to MR2n, may be determined according to a method described below.

At a time T7, the memory region MR21 may be accessed according to an access sequence arranged in the second memory region list LIST2. When the memory region MR21 is closed, the log unit 112A may log information on the memory region MR21 in the log region 211A. Likewise, each of the memory regions in the second memory region list LIST2 is accessed sequentially and when each memory region is closed the log unit logs information on the respective memory region that is closed.

For example, at a time T8, the memory region MR22 may be in use, i.e., in the state of being accessed, according to the access sequence arranged in the second memory region list LIST2.

As described above with reference to FIG. 11, the updating of the map data for the first memory region list LIST1 at the time T5 precedes the logging of the second memory region list LIST2 at the time T6. Also, as explained earlier, when all memory blocks have been accessed then the updated map data which are stored in the working memory 120A are copied into the map data region 212A. Accordingly, the logging of a succeeding memory region list in the log region 211A, may confirm that an update of map data for a previous memory region list has been completed.

Figure 12:
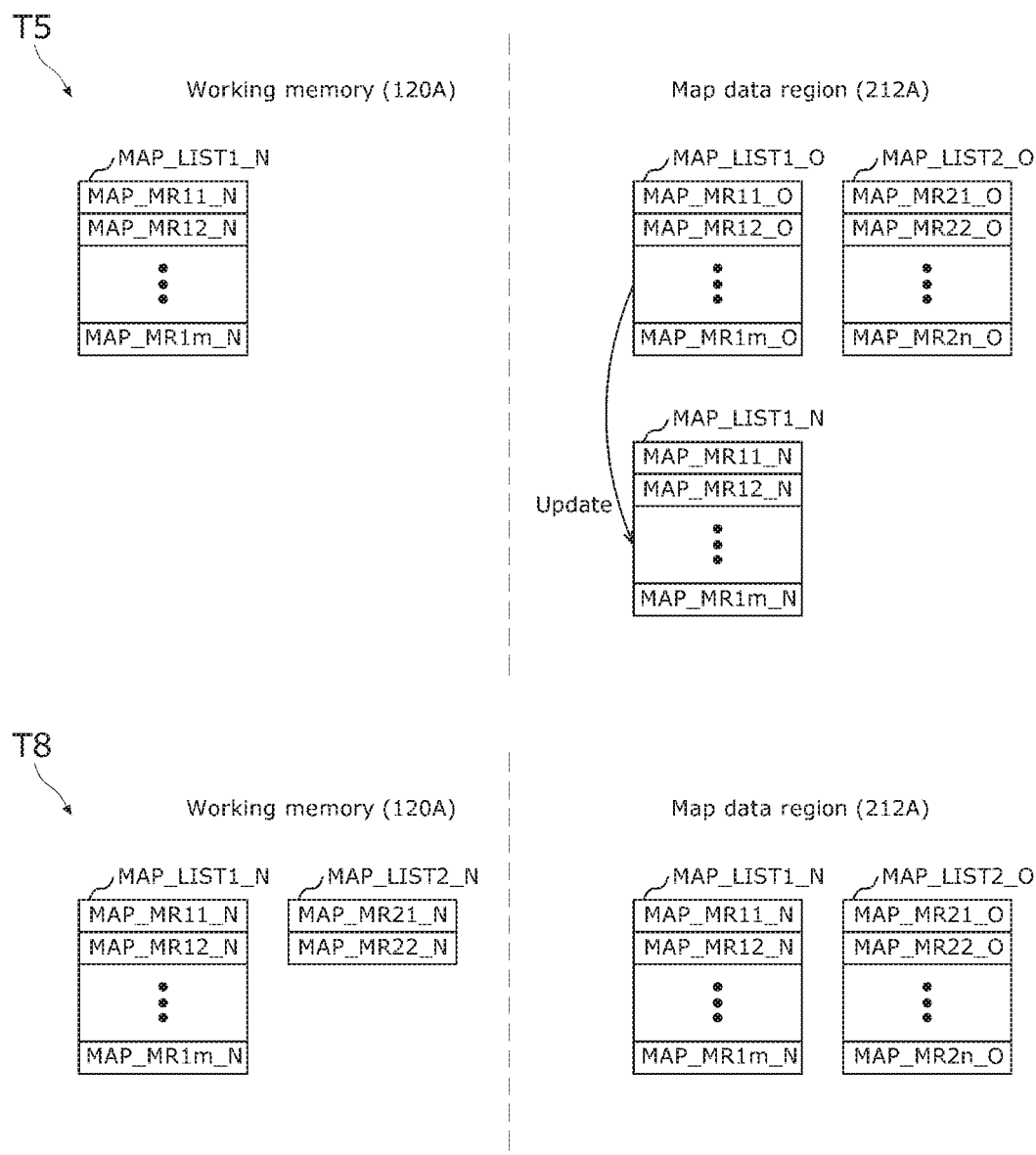
FIG. 12 is a diagram illustrating states of map data.

FIG. 12 is a diagram illustrating states of map data at the times T5 and T8 of FIG. 11.

Referring to FIG. 12, at the time T5 when all of the memory regions MR11 to MR1m included in the first memory region list LIST1 have been accessed, map data MAP_LIST1_N for the first memory region list LIST1 stored in the working memory 120A may be up to date because they were generated while the memory regions MR11 to MR1m were accessed. The up-to-date map data MAP_LIST1_N may include map data MAP_MR11_N to MAP_MR1m_N for the memory regions MR11 to MR1m. Conversely, out-of-date map data MAP_LIST1_O for the first memory region list LIST1 may include map information before the first memory region list LIST1 is accessed. Therefore, the out-of-date map data MAP_LIST1_O stored in the map data region 212A may be updated based on the up-to-date map data MAP_LIST1_N stored in the working memory 120A. For example, as explained above, the updated map data stored in the working memory 120A may be copied into the map data region 212A when all the memory regions of the first memory list have been accessed and before the new memory region list is logged.

At the time T5, the map data region 212A may retain also map data MAP_LIST2_O for the second memory region list LIST2. The map data MAP_LIST2_O may include map information before the second memory region list LIST2 is accessed. Because it is before the second memory region list LIST2 is accessed, the map data MAP_LIST2_O may still be up to date. However, in the case where all of the memory regions MR21 to MR2n included in the second memory region list LIST2 are erased, the map data MAP_LIST2_O may be out of date.

At the time T8 when the memory region MR22 included in the second memory region list LIST2 is being accessed, the working memory 120A may retain up-to-date map data MAP_LIST2_N for the second memory region list LIST2. The up-to-date map data MAP_LIST2_N may include map data MAP_MR21_N and MAP_MR22_N for the memory regions MR21 and MR22. However, the map data MAP_MR21_O and MAP_MR22_O stored in the map data region 212A may be still out of date because it is before the up-to-date map data MAP_LIST2_N are copied into the map data region.

Figure 13:
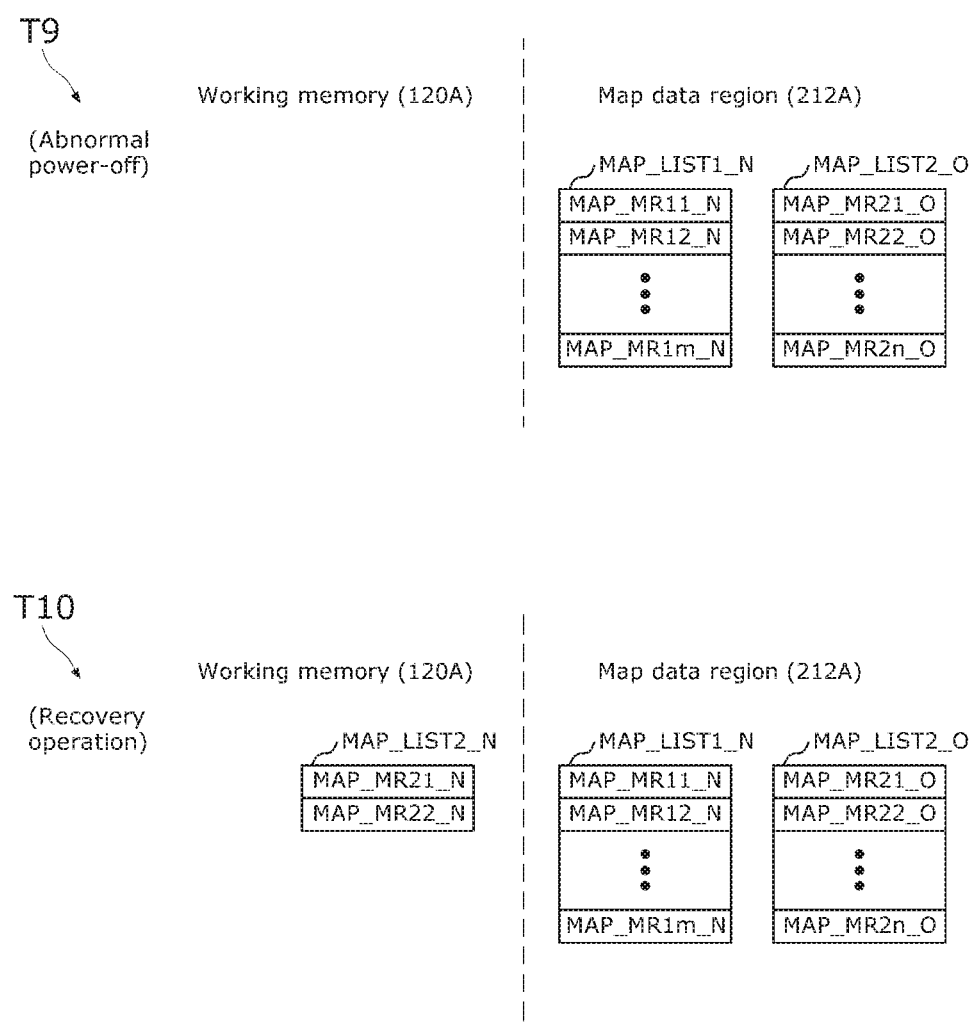
FIG. 13 is a diagram illustrating a map data recovery operation when an abnormal power-off occurs.

FIG. 13 is a diagram illustrating a map data recovery operation when an abnormal power-off occurs after the time T8 of FIGS. 11 and 12.

Referring to FIG. 13, at a time T9 after the time T8, if an abnormal power-off occurs, all the map data stored in the working memory 120A may be lost when the working memory 120A is volatile. However, the map data MAP_LIST1_N and MAP_LIST2_O stored in the map data region 212A are retained.

At a time T10, the recovery unit 114A may recover only the map data MAP_LIST2_N for the second memory region list LIST2. Namely, because the up-to-date map data MAP_LIST2_N for the memory regions MR21 and MR22 of the second memory region list LIST2 are not reflected in the map data region 212A at the time of the abnormal power-off, they should be recovered. However, because the up-to-date map data MAP_LIST1_N for the first memory region list LIST1 had not been reflected (copied, updated) in the map data region 212A at the time of the abnormal power-off, they do not need to be recovered.

As described above, the map data to be recovered for the memory regions MR21 and MR22 may be stored in the memory regions MR21 and MR22 together with corresponding data. The recovery operation may be performed by collecting map data stored in a recovery range, that is, the memory regions MR21 and MR22.

As the amount of the map data to be recovered increases, the time it takes to recover the map data of the working memory also increases. Therefore, it is preferable to recover only as many items of data as required to be recovered. In the present embodiment, the recovery unit 114A may determine a map data recovery range, that is, a map data loss range. In FIG. 13, a map data loss range may be the memory regions MR21 and MR22. As described below, a map data loss range may be determined efficiently by tracing the log region 211A.

Figure 14:
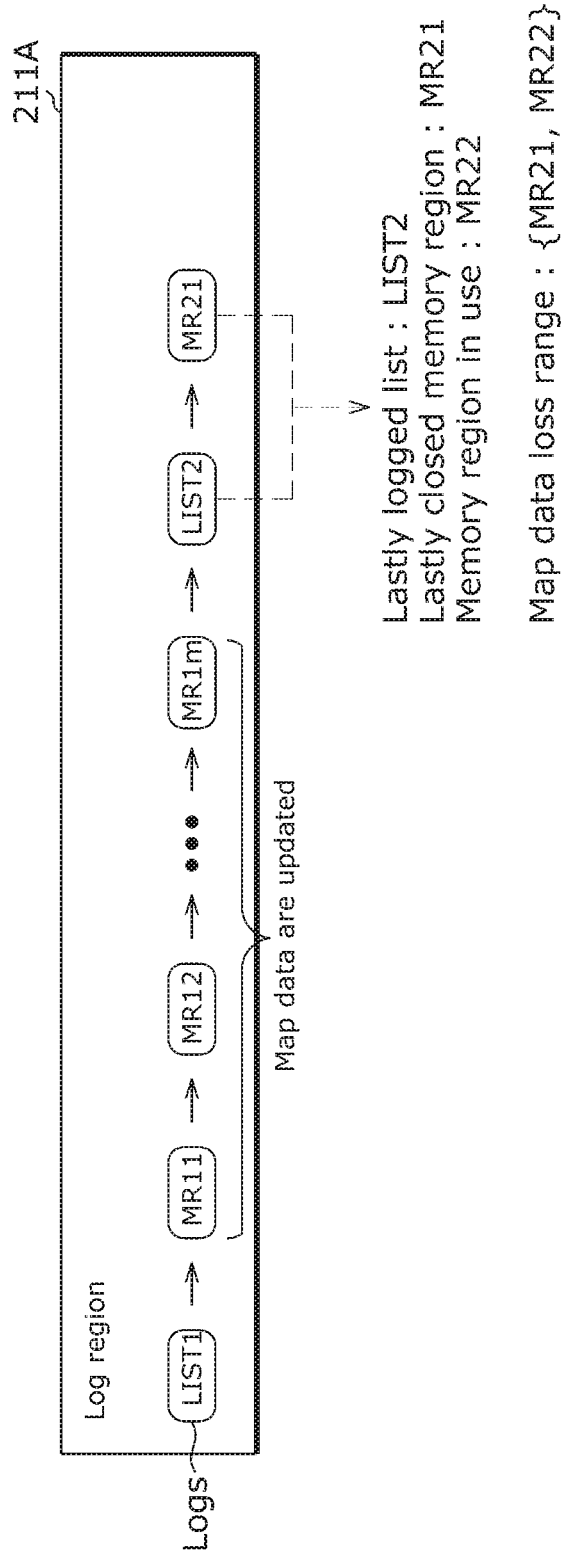
FIG. 14 is a diagram illustrating a method of determining a map data loss range.

FIG. 14 is a diagram illustrating a method of determining a map data loss range by the recovery unit 114A.

Referring to FIG. 14, the recovery unit 114A may detect a lastly logged memory region list in the log region 211A. If the second memory region list LIST2 is lastly logged in the log region 211A, the recovery unit 114A may determine that all of the map data for the memory regions MR11 to MR1m included in the first memory region list LIST1, which is supposed as logged before the second memory region list LIST2, are updated into the map data region 212A. That is to say, as described above, since update of the map data for the first memory region list LIST1 is performed into the map data region 212A before logging the second memory region list LIST2, log of the second memory region list LIST2 may represent the completion of update of the map data for the first memory region list LIST1 into the map data region 212A.

Further, based on information on the second memory region list LIST2 and the memory region MR21 which are lastly logged, the recovery unit 114A may detect that the lastly logged memory region MR21 is closed just before the abnormal power-off and the memory region MR22, which is the one immediately subsequent to (in terms of an access sequence) the lastly logged memory region MR21, was being used at the time of the abnormal power-off. Thus, the recovery unit 114A may determine that the map data for the memory regions MR21 and MR22 are not updated into the map data region 212A, and determine the memory regions MR21 and MR22 as a map data loss range.

Summarizing the above, the recovery unit 114A may detect a lastly logged memory region list and a lastly logged (i.e., a lastly closed) memory region in the log region 211A, and determine as a map data loss range the lastly closed memory region and the subsequently accessible memory region among the memory regions in the lastly logged memory region list.

Below, the relationship between a map data loss range and a list size of a lastly logged memory region list is described.

Figure 15A:
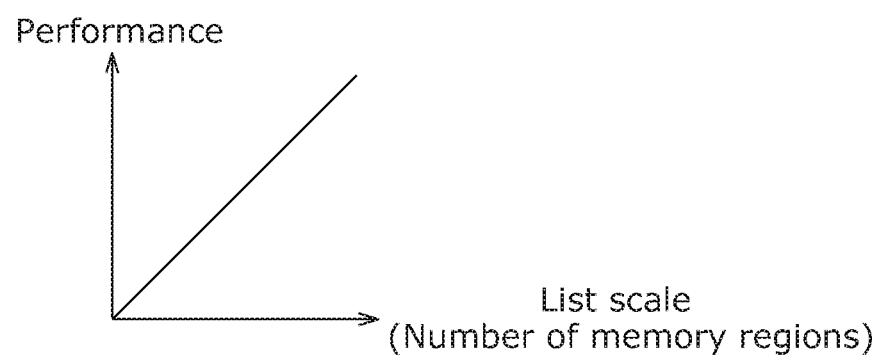
FIG. 15A is a graph illustrating the relationship between a list size and performance of the memory system.
Figure 15B:
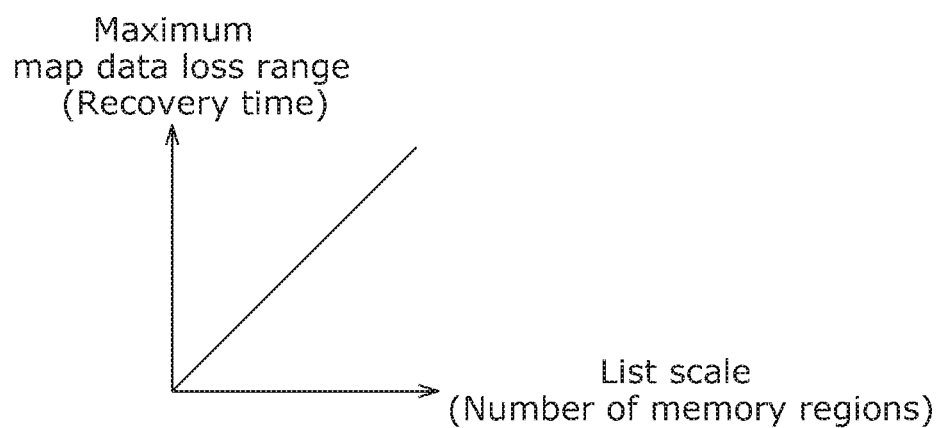
FIG. 15B is a graph illustrating the relationship between a list size and a maximum map data recovery range.

FIG. 15A is a graph illustrating the relationship between a list size and performance of the memory system 10A. FIG. 15B is a graph illustrating the relationship between a list size and a maximum map data recovery range.

Referring to FIG. 15A, as a list size of a memory region list becomes larger, performance of the memory system 10A may also improve. This is because, if the number of memory regions included in a memory region list increases, the map data update of the memory system is performed less frequently. In general, frequent map data update is likely to degrade the performance of the memory system 10A.

Referring to FIG. 15B, as a list size of a memory region list, which may be the lastly logged version at the time of an abnormal power-off, becomes larger, a maximum map data loss range may also increase. A maximum map data loss range may be all of memory regions included in a lastly logged memory region list. It takes longer to recover more memory regions, which represents a greater map data loss range. In general, a longer recovery process during booting of the memory system 10A is not preferable.

Summarizing the above, there is a trade-off relationship between performance of the memory system 10A and maximum recovery time with respect to a list size are. Namely, as a list size becomes larger, the performance of the memory system 10A may improve, however, a recovery time may increase. In this situation, as described below, the list generation unit 111A may determine, based on the workload of the memory system 10A, which effects which of the competing considerations of performance improvement of the memory system 10A and short recovery time is to be emphasized, and determine a list scale therefrom.

FIG. 16 is a diagram illustrating a method for determining a list size based on the workload of the memory system 10A.

Referring to FIG. 16, the list generation unit 111A may determine based on a result of analyzing the workload of the memory system 10A whether a sequential write operation or a random write operation is to be more frequent. The list generation unit 111A may determine a list size as "Ns" when a sequential write operation is more frequent than a random write operation, and as "Nr" when a random write operation is more frequent than a sequential write operation. "Ns" may be equal to or larger than 1 and may be equal to or smaller than "Nr." "Nr" may be equal to or larger than "Ns" and may be equal to or smaller than "Nsp." "Nsp" may be a maximum list size that can be processed during a set booting time.

The reason for determining a list size in this way is as follows. First, generally, data written through a sequential write operation (e.g., data fragment of a large-volume video file) is relatively hardly changed, hence, map data for such data of the sequential write operation may not be frequently updated even with a memory region list of a small list size, which means avoidance of the degradation of the performance of the memory system 10A even with a memory region list of a small list size. When the list size of the memory region list is small for the data of the sequential write operation, a map data recovery time will be short when an abnormal power-off occurs. Therefore, when it is determined that a sequential write operation is more frequent than a random write operation, the list generation unit 111A may focus on a short map data recovery time by determining a list size as "Ns".

However, data written through a random write operation may be changed relatively frequently. Since the changed data should be written into new location in the memory system 10A, change of data may cause update of corresponding map data. Therefore, when a random write operation is determined to be more frequent than a sequential write operation, a memory region list of a large list size is preferable to the data of the random write operation in order to avoid frequent update of map data. Using a large size memory region list in this situation avoids or minimizes performance degradation of the memory system 10A. Therefore, when it is determined that a random write operation is more frequent than a sequential write operation, the list generation unit 111A may focus on improving the performance of the memory system 10A at the cost of the short map data recovery time by determining a list size as "Nr" equal to or larger than "Ns".

According to an embodiment, if it is determined that the frequency of a sequential write operation is the same as that of a random write operation, the list generation unit 111A may determine a certain value between "Ns" and "Nr" as a list size.

As exemplified in FIG. 16, the list generation unit 111A may determine a list size by allocating a single value to each of a sequential write operation and a random write operation. In another embodiment, described below, the list generation unit 111A may determine a list size by allocating multiple values to each of a sequential write operation and a random write operation.

FIG. 17 is a diagram illustrating another method for determining a list size based on the workload of the memory system 10A.

Referring to FIG. 17, the list generation unit 111A may determine based on a result of analyzing the workload of the memory system 10A whether a sequential write operation or a random write operation is to be more frequent as well as whether each of the sequential write operation and the random write operation is highly frequent or relatively infrequent. As described above, the list generation unit 111A may determine a smaller list size as the frequency of a sequential write operation becomes larger, and determine a larger list size as the frequency of a random write operation increases. In other words, the list generation unit 111A may determine a list size as "Ns1" equal to or larger than "1" when the frequency of a sequential write operation is high and as "Ns2" equal to or larger than "Ns1" when the frequency of a sequential write operation is low. Further, the list generation unit 111A may determine a list size as "Nr1" equal to or larger than "Ns2" when the frequency of a random write operation is low and as "Nr2" equal to or larger than "Nr1" and equal to or smaller than "Nsp" when the frequency of a random write operation is high. As described above, "Nsp" may be a maximum list size that can be processed during a set booting time.

According to an embodiment, three or more values may be allocated to each of a sequential write operation and a random write operation.

Analysis of a workload may be performed based on various known analysis techniques.

Figure 18:
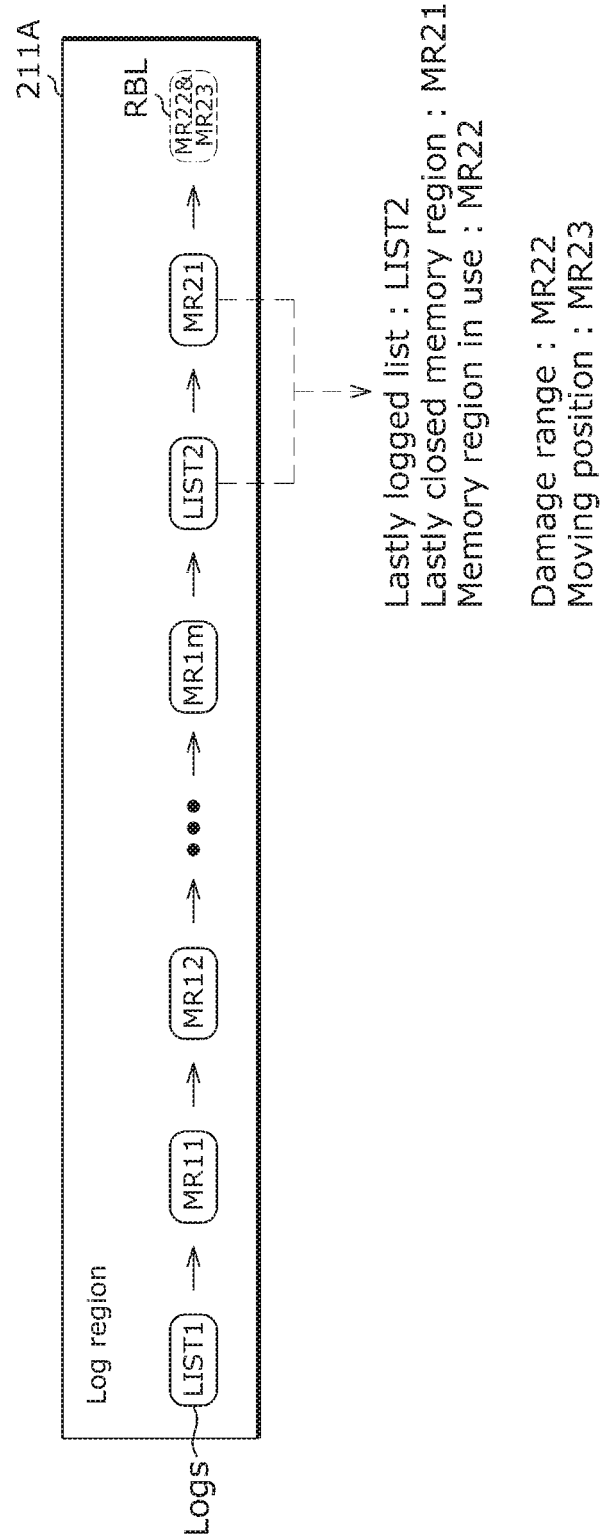
FIG. 18 is a diagram illustrating a recovery operation of the recovery unit for a memory region damage range.

FIG. 18 is a diagram illustrating a recovery operation of the recovery unit 114A for a memory region damage range.

As described above with reference to FIG. 14, the recovery unit 114A may determine a map data loss range during a boot operation immediately after an abnormal power-off, and perform a recovery operation for the map data loss range. Moreover, the recovery unit 114A may perform a data moving operation for a memory region damage range during the boot operation. The memory region damage range may be one or more memory regions being used at the time of an abnormal power-off. A process for determining a memory region damage range may be substantially similar to the process of determining the map data loss range described above, and may be performed simultaneously. In other words, the recovery unit 114A may detect a lastly logged memory region list and a lastly logged (i.e., a lastly closed) memory region in the log region 211A, and determine as a memory region damage range a map region immediately subsequent to the lastly closed memory region in the lastly logged memory region list.

In detail, referring to FIG. 18, the recovery unit 114A may determine the memory region MR22 as a memory region damage range based on the logs stored in the log region 211A. Namely, when the second memory region list LIST2 and the memory region MR21 which are logged lastly in the log region 211A, the recovery unit 114A may determine that the memory region MR21 is closed before the abnormal power-off and the memory region MR22 is being used at the time of the abnormal power-off.

Then, the recovery unit 114A may store in the log region 211A a log RBL on the memory region damage range MR22 and a moving position MR23 (i.e., a new memory region for the memory region damage range MR22). After storing the log RBL, the recovery unit 114A may move the data stored in the memory range damage range MR22 to the new memory region MR23. That is to say, the moving position MR23 may be a memory region immediately subsequent to the memory region damage range MR22 according to a sequence arranged in the second memory region list LIST2.

The log RBL may be stored in preparation for a case where an abnormal power-off is repeated while a data moving operation is performed with the new memory region MR23 for the damage range MR22. If the log RBL is found in the log region 211A during the booting after an abnormal power-off, which means that the abnormal power-off is repeated while a data moving operation is performed with the new memory region MR23 for the damage range MR22, the recovery unit 114A may discard the current value of the log RBL. The recovery unit 114A may store in the log region 211A the log RBL on the memory region damage range MR22 and a new moving position MR24, and then, perform the data moving operation with the new moving position MR24 for the memory region damage range MR22.

Figure 19:
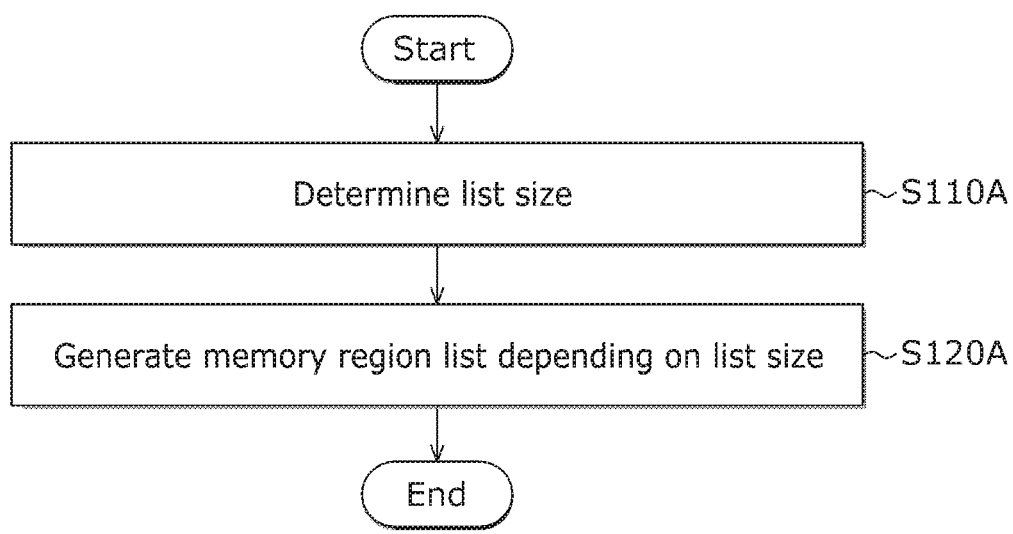
FIG. 19 is a flow chart illustrating a method for operating a list generation unit of FIG. 10.

FIG. 19 is a flow chart illustrating a method for operating the list generation unit 111A.

At step S110A, the list generation unit 111A may determine a list size depending on the frequencies of a sequential write operation and a random write operation as described above with reference to FIGS. 15A to 17. In detail, the list size may be determined as a first size (e.g., "Ns") when it is determined that a sequential write operation is more frequent than a random write operation, and may be determined as a second size (e.g., "Nr") equal to or larger than the first size when it is determined that a random write operation is more frequent than a sequential write operation. According to an embodiment, the list size may be determined to become smaller as the frequency of a sequential write operation becomes larger, and may be determined to become larger as the frequency of a random write operation becomes larger, as described above with reference to FIG. 17.

At step S120A, the list generation unit 111A may generate a memory region list including one or more memory regions, which are to be sequentially used for a purpose of data storage, depending on the list size. The list generation unit 111A may generate a succeeding memory region list in advance before all of memory regions included in a previous memory region list are accessed. Alternatively, the list generation unit 111A may generate a succeeding memory region list after all of memory regions included in a previous memory region list are accessed. In an embodiment, the memory region list may store the location of the level 2 management block B2 stored in the level 1 management block B1 and/or the storage order of the level 1 management block B1, in FIG. 1.

Figure 20:
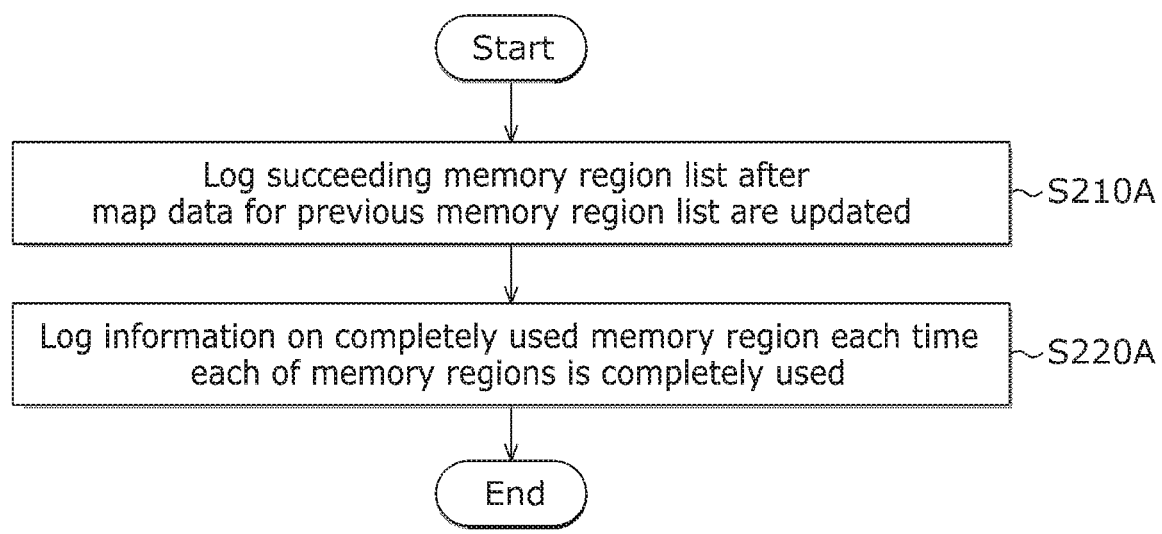
FIG. 20 is a flow chart illustrating a method for operating a log unit shown in FIG. 10.

FIG. 20 is a flow chart illustrating a method for operating the log unit 112A.

At step S210A, after map data for a previous memory region list are updated, the log unit 112A may log a succeeding memory region list in the log region 211A before accessing memory regions included in the succeeding memory region list.

At step S220A, each time each of the memory regions is completely accessed, i.e. is closed, the log unit 112A may log an information on the completely accessed memory region in the log region 211A.

Figure 21:
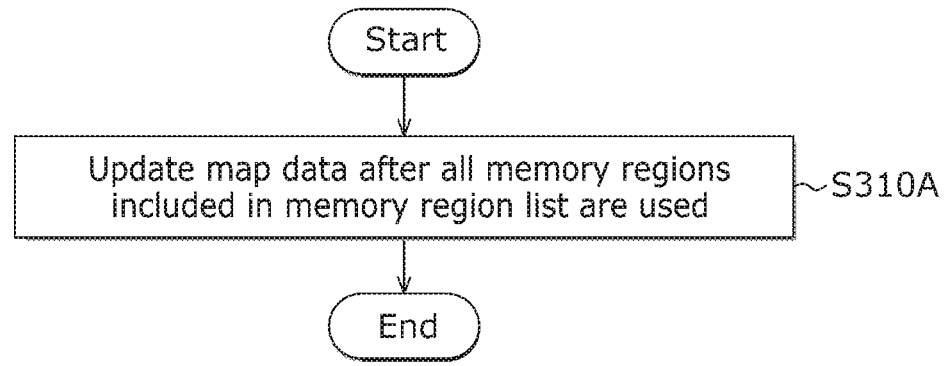
FIG. 21 is a flow chart illustrating a method for operating a map management unit shown in FIG. 10.

FIG. 21 is a flow chart illustrating a method for operating the map management unit 113A.

At step S310A, after all of memory regions included in a memory region list are accessed, the map management unit 113A may update map data for the memory regions. In detail, the map management unit 113A may update out-of-date map data stored in the map data region 212A based on up-to-date map data stored in the working memory 120A.

Figure 22:
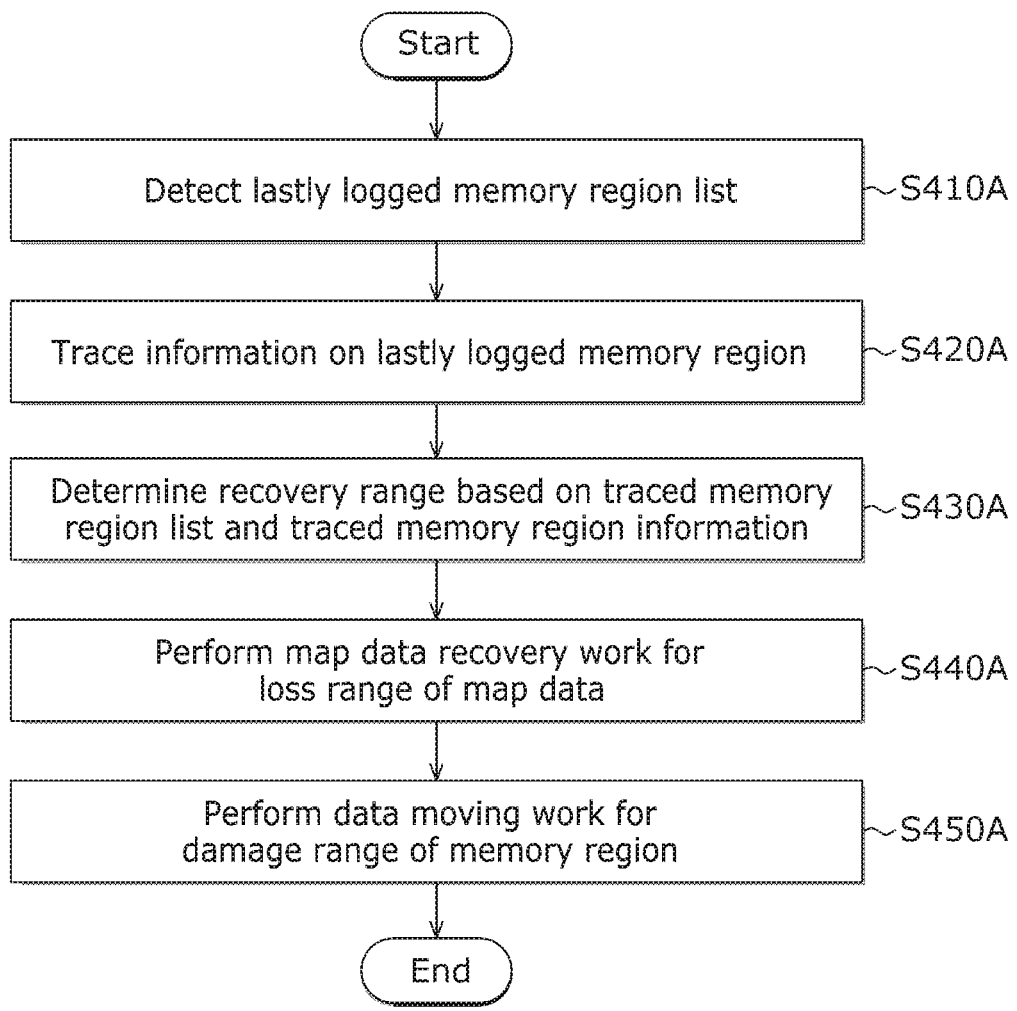
FIG. 22 is a flow chart illustrating a recovery operation method of a recovery unit shown in FIG. 10 for an abnormal power-off.

FIG. 22 is a flow chart illustrating a recovery operation method of the recovery unit 114A.

At step S410A, the recovery unit 114A may detect a lastly logged memory region list from log data in the log region 211A.

At step S420A, the recovery unit 114A may detect a lastly logged (i.e., a lastly closed) memory region from log data in the log region 211A.

At step S430A, the recovery unit 114A may determine a recovery range based on the memory region list and the information on the memory region which are detected. In detail, the recovery unit 114A may determine as a map data loss range a first one to an immediately subsequent one of the lastly closed memory region among the memory regions in the lastly logged memory region list. Further, the recovery unit 114A may determine as a memory region damage range a memory region immediately subsequent to the lastly closed memory region in the lastly logged memory region list.

At step S440A, the recovery unit 114A may perform a map data recovery operation for the map data loss range. The recovery unit 114A may recover lost map data in the working memory 120A by collecting the map data stored in memory regions as the map data loss range.

At step S450A, the recovery unit 114A may perform a data moving operation for the memory region damage range. The recovery unit 114A may determine as a moving position a memory region immediately subsequent to the memory region damage range in the lastly logged memory region list, and move data stored in the memory region damage range to the moving position.

While it is illustrated in FIG. 22 that the data moving operation is performed at the step S450A after the map data recovery operation is performed, it is to be noted that the present invention is not limited to this order.

Figure 23:
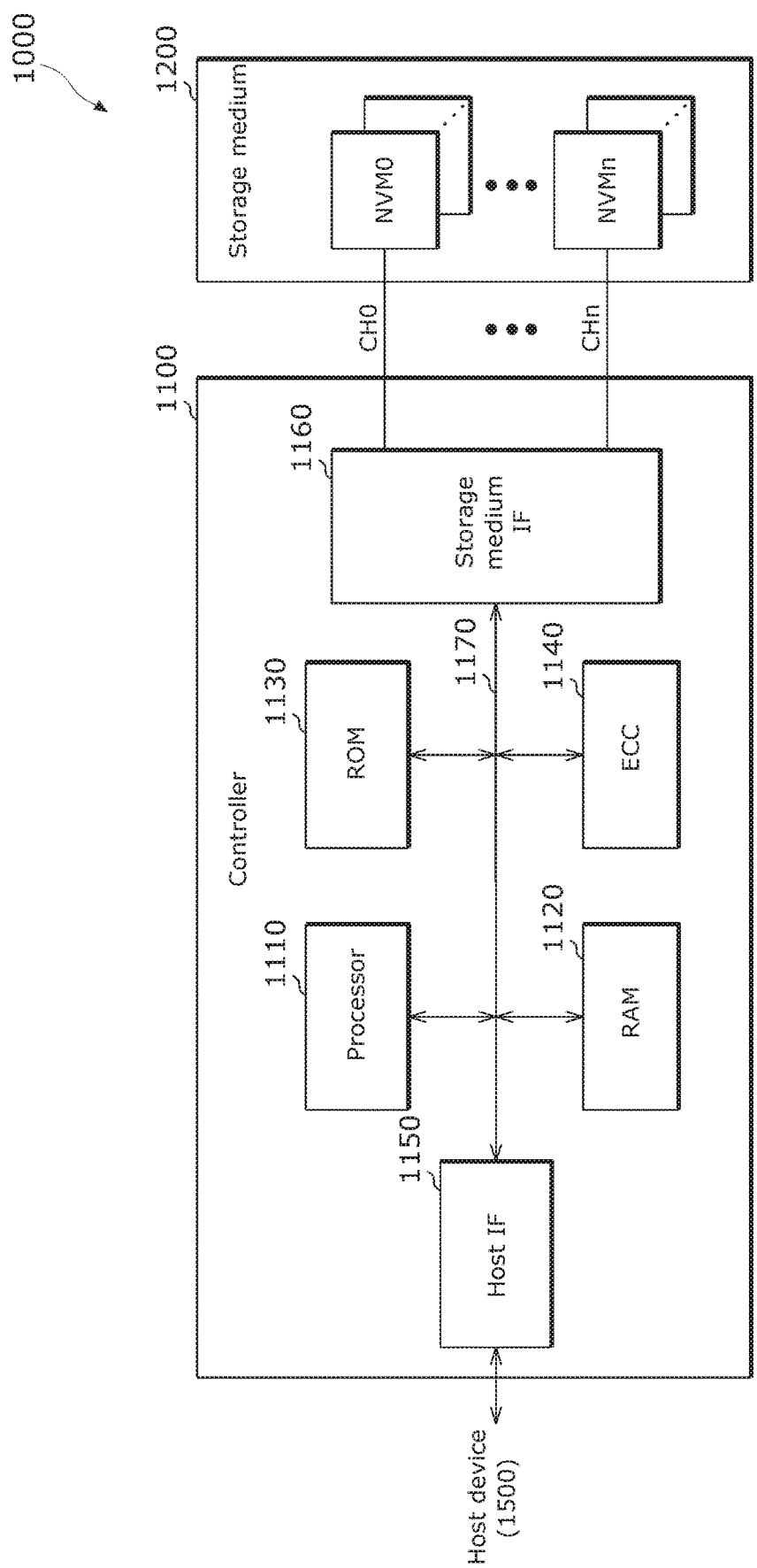
FIG. 23 is a block diagram illustrating a solid-state drive (SSD) in accordance with an embodiment.

FIG. 23 is a block diagram illustrating a solid-state drive (SSD) 1000 in accordance with an embodiment.

The SSD 1000 may include a controller 1100 and a storage medium 1200.

The controller 1100 may control data exchange between a host device 1500 and the storage medium 1200. The controller 1100 may include a processor 1110, a RAM 1120, a ROM 1130, an ECC unit 1140, a host interface 1150 and a storage medium interface 1160 which are coupled through an internal bus 1170.

The processor 1110 may control general operations of the controller 1100. The processor 1110 may store data in the storage medium 1200 and read stored data from the storage medium 1200, according to data processing requests from the host device 1500. In order to efficiently manage the storage medium 1200, the processor 1110 may control internal operations of the SSD 1000 such as a merge operation, a wear leveling operation, and so forth.

The processor 1110 may be configured and operate substantially similarly to the processor 110 of FIG. 10, with respect to the memory regions included in the storage medium 1200. That is to say, the processor 1110 may update, after accessing all of one or more first memory regions included in a first memory region list for a purpose of data storage, map data for the first memory regions, determine a list size based on the workload of the SSD 1000, generate a second memory region list including one or more second memory regions depending on the list size, and use, after the update of the map data for the first memory regions, the second memory regions for a purpose of data storage.

According to an embodiment, the processor 1110 may determine a list size based on the workload of the SSD 1000, generate a memory region list including one or more memory regions depending on the list size, log the memory region list before accessing the memory regions included in the memory region list for a purpose of data storage, and update map data for the memory regions after accessing all of the memory regions for a purpose of data storage.

According to an embodiment, the processor 1110 may log a first memory region list before accessing one or more first memory regions included in the first memory region list for a purpose of data storage, update map data for the first memory regions after accessing all of the first memory regions for a purpose of data storage, and log a second memory region list before accessing one or more second memory regions included in the second memory region list for a purpose of data storage, wherein the logging of the second memory region list may succeed the update of the map data for the first memory regions.

The RAM 1120 may store programs and program data to be used by the processor 1110. The RAM 1120 may temporarily store data transmitted from the host interface 1150 before transferring it to the storage medium 1200, and may temporarily store data transmitted from the storage medium 1200 before transferring it to the host device 1500.

The RAM 1120 may correspond to the working memory 120 of FIG. 10. That is to say, the RAM 1120 may retain new map data 121.

The ROM 1130 may store program codes to be read by the processor 1110. The program codes may include commands to be processed by the processor 1110, for the processor 1110 to control the internal units of the controller 1100.

The ECC unit 1140 may encode data to be stored in the storage medium 1200, and may decode data read from the storage medium 1200. The ECC unit 1140 may detect and correct an error occurred in data, according to an ECC algorithm.

The host interface 1150 may exchange data processing requests, data, etc. with the host device 1500.

The storage medium interface 1160 may transmit control signals and data to the storage medium 1200. The storage medium interface 1160 may be transmitted with data from the storage medium 1200. The storage medium interface 1160 may be coupled with the storage medium 1200 through a plurality of channels CH0 to CHn.

The storage medium 1200 may include a plurality of nonvolatile memory devices NVM0 to NVMn. Each of the plurality of nonvolatile memory devices NVM0 to NVMn may perform a write operation and a read operation according to control of the controller 1100.

The storage medium 1200 may be configured and operate in substantially the same way as the storage medium 200 shown in FIG. 10.

Figure 24:
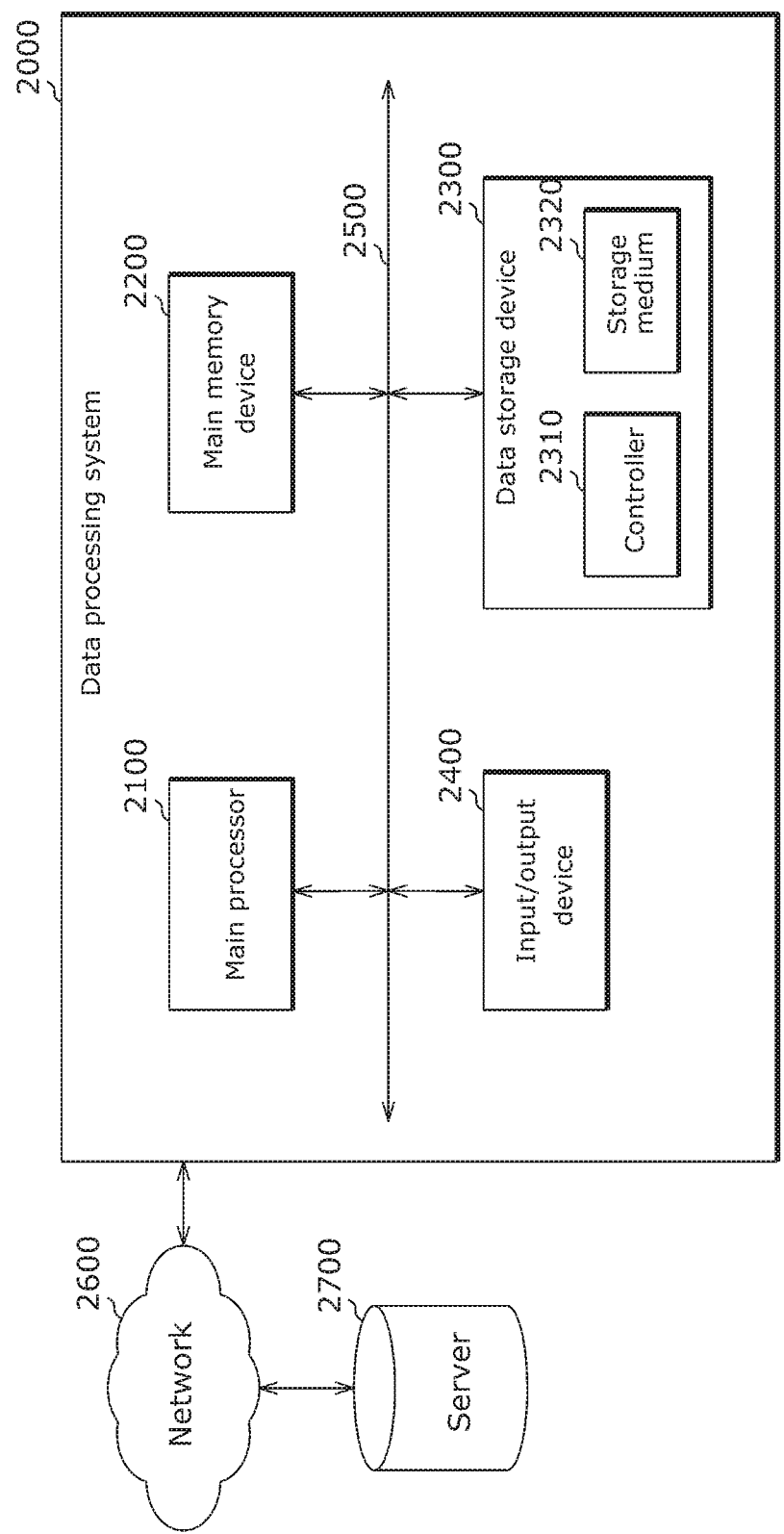
FIG. 24 is a block diagram illustrating an exemplary data processing system to which the memory system is applied in accordance with an embodiment.

FIG. 24 is a block diagram illustrating a data processing system 2000 to which the memory system 10 is applied in accordance with an embodiment.

The data processing system 2000 may include a computer, a laptop, a netbook, a smart phone, a digital TV, a digital camera, a navigator, etc. The data processing system 2000 may include a main processor 2100, a main memory device 2200, a memory system 2300, and an input/output device 2400. The internal units of the data processing system 2000 may exchange data, control signals, etc. through a system bus 2500.

The main processor 2100 may control general operations of the data processing system 2000. The main processor 2100 may be a central processing unit such as a microprocessor. The main processor 2100 may execute software such as an operation system, an application, a device driver, and so forth, on the main memory device 2200.

The main memory device 2200 may store programs and program data to be used by the main processor 2100. The main memory device 2200 may temporarily store data to be transmitted to the memory system 2300 and the input/output device 2400.

The memory system 2300 may include a controller 2310 and a storage medium 2320. The memory system 2300 may be configured and operate substantially similarly to the memory system 10 of FIG. 10.

The input/output device 2400 may include a keyboard, a scanner, a touch screen, a screen monitor, a printer, a mouse, or the like, capable of exchanging data with a user, such as receiving a command for controlling the data processing system 2000 from the user or providing a processed result to the user.

According to an embodiment, the data processing system 2000 may communicate with at least one server 2700 through a network 2600 such as a LAN (local area network), a WAN (wide area network), a wireless network, and so on. The data processing system 2000 may include a network interface (not shown) to access the network 2600.

Figure 25:
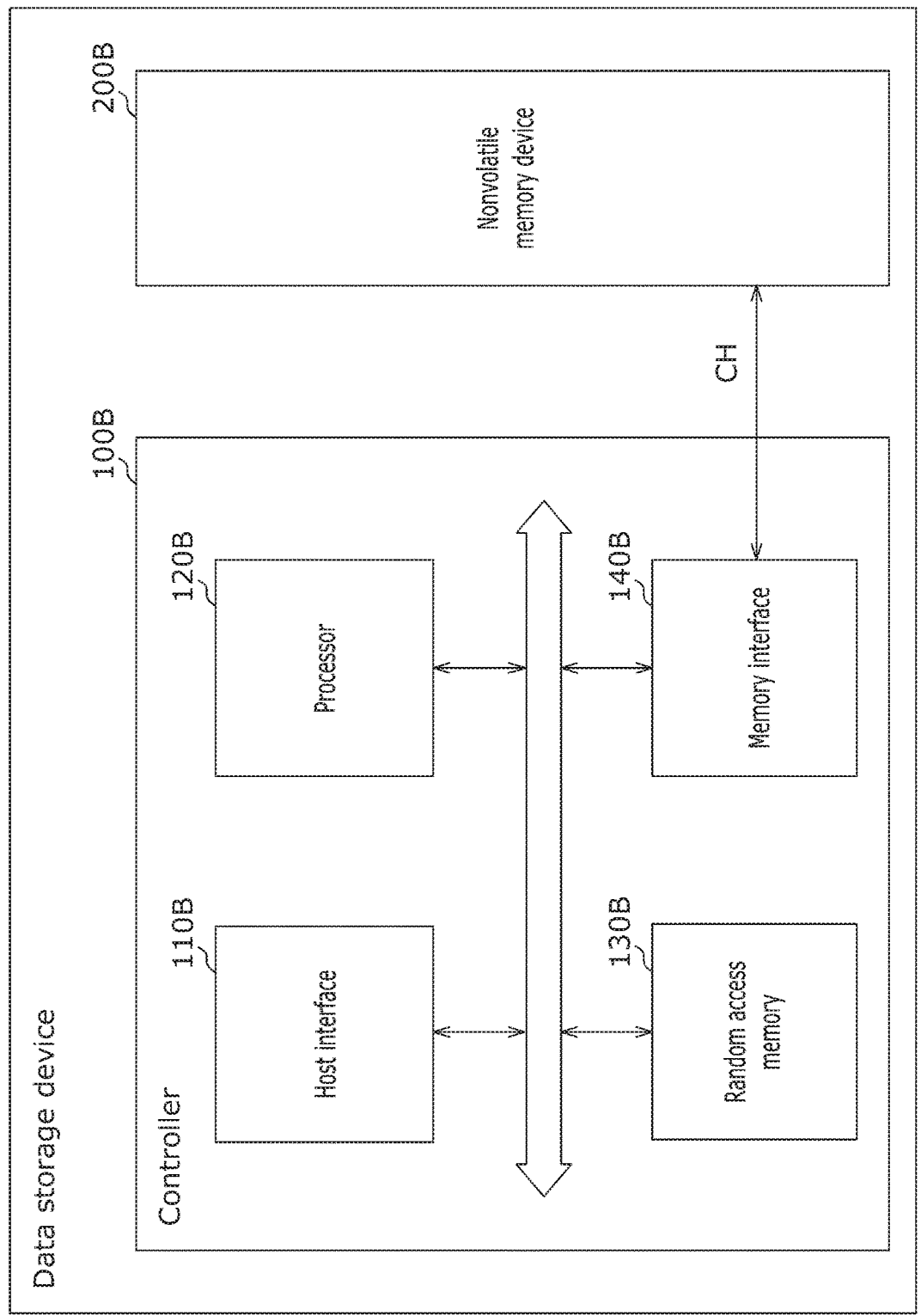
FIG. 25 is a block diagram illustrating a configuration of a data storage device in accordance with an embodiment of the present disclosure.

FIG. 25 is a block diagram illustrating an example of the configuration of a data storage device 10B in accordance with an embodiment. In the present embodiment, the data storage device 10B may store data to be accessed by a host device (not shown) such as a mobile phone, an MP3 player, a laptop computer, a desktop computer, a game player, a TV, an in-vehicle infotainment system, and so forth. The data storage device 10B may also be referred to as a memory system. The data storage device 10B may be operatively coupled to the host via any suitable method.

The data storage device 10B may be manufactured as any of various kinds of storage devices according to a host interface meaning a transmission protocol with respect to the host device. For example, the data storage device 10B may be configured as a solid state drive, a multimedia card in the form of an MMC, an eMMC, an RS-MMC and a micro-MMC, a secure digital card in the form of an SD, a mini-SD and a micro-SD, a universal serial bus (USB) storage device, a universal flash storage (UFS) device, a Personal Computer Memory Card International Association (PCMCIA) card type storage device, a peripheral component interconnection (PCI) card type storage device, a PCI express (PCI-E) card type storage device, a compact flash (CF) card, a smart media card, and/or a memory stick.

The data storage device 10B may be manufactured as any of various kinds of package types. For example, the data storage device 10B may be manufactured as a package-on-package (POP), a system-in-package (SIP), a system-on-chip (SOC), a multi-chip package (MCP), a chip-on-board (COB), a wafer-level fabricated package (WFP) and/or a wafer-level stack package (WSP).

Referring to FIG. 25, the data storage device 10B may include a nonvolatile memory device 200B and a controller 100B.

The nonvolatile memory device 200B may operate as the storage medium of the data storage device 10B. The nonvolatile memory device 200B may be configured by any of various types of nonvolatile memory devices such as a NAND flash memory device, a NOR flash memory device, a ferroelectric random-access memory (FRAM) using a ferroelectric capacitor, a magnetic random-access memory (MRAM) using a tunneling magneto-resistive (TMR) layer, a phase change random-access memory (PRAM) using a chalcogenide alloy, and a resistive random-access memory (RERAM) using a transition metal compound, depending on memory cells.

The nonvolatile memory device 200B may include a memory cell array which has a plurality of memory cells respectively disposed at regions where a plurality of bit lines (not shown) and a plurality of word lines (not shown) intersect with each other. The memory cell array may include a plurality of memory blocks, and each of the plurality of memory blocks may include a plurality of pages.

For example, each memory cell of the memory cell array may be a single level cell (SLC) storing one bit, a multi-level cell (MLC) capable of storing 2-bit data, a triple level cell (TLC) capable of storing 3-bit data or a quadruple level cell (QLC) capable of storing 4-bit data. The memory cell array may include one or more SLCs, MLCs, TLCs and/or QLCs. The memory cell array may include memory cells of a 2-dimensional horizontal structure or memory cells of a 3-dimensional vertical structure.

Figure 26:
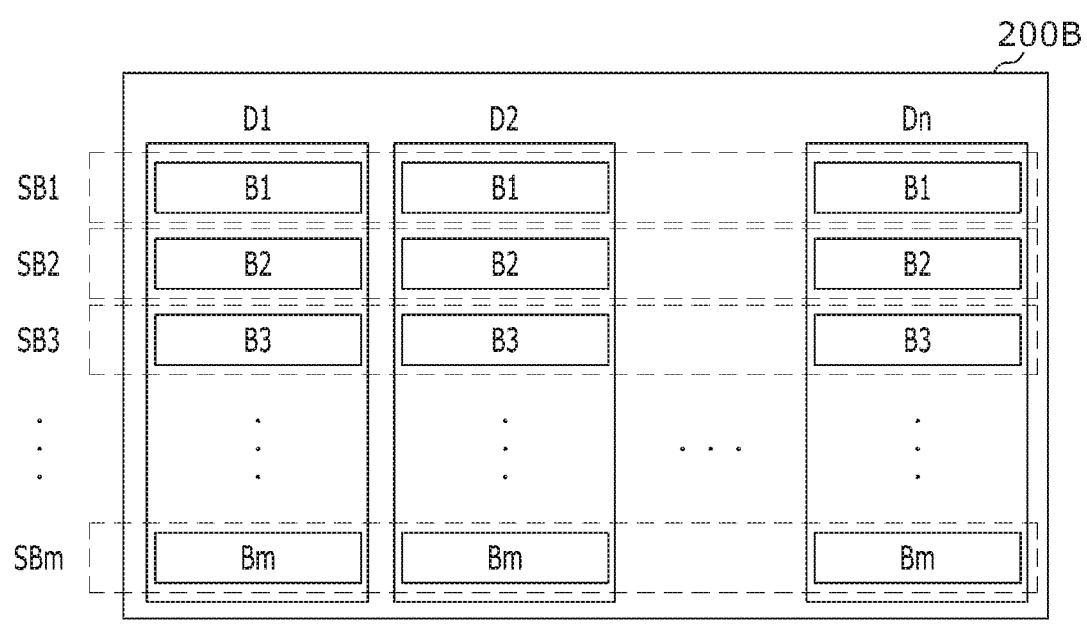
FIG. 26 is a diagram illustrating a configuration of a nonvolatile memory device in accordance with an embodiment of the present disclosure.

FIG. 26 is a diagram illustrating an example configuration of a nonvolatile memory device.

Referring to FIG. 26, the nonvolatile memory device 200B may include a plurality of dies D1 to Dn. Each of the dies D1 to Dn may include a plurality of memory blocks B1 to Bm. While not illustrated in FIG. 26, each of the dies D1 to Dn may include a plurality of planes, and each of the planes may include a plurality of memory blocks. In FIG. 26, planes are omitted for the sake of simplification in illustration.

As shown in FIG. 26, the nonvolatile memory device 200B may include a plurality of super blocks, that is, first to math super blocks SB1 to SBm. Each of the first to math super blocks SB1 to SBm may include a plurality of memory blocks. For example, the first super block SB1 may include the first memory blocks B1 of the first to n^th dies D1 to Dn. Similarly, the second super block SB2 may include the second memory blocks B2 of the first to n^th dies D1 to Dn, and so on and so forth the math super block SBm may include the math memory blocks Bm of the first to n^th dies D1 to Dn.

The controller 100B may include a host interface 110B, a processor 120B, a random-access memory 130B and a memory interface 140B.

The host interface 110B may interface the host device (not shown) and the data storage device 10B. For example, the host interface 110B may communicate with the host device by using any one among standard transmission protocols such as universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI) and PCI express (PCI-E) protocols.

The processor 120B may be configured by a micro control unit (MCU) or a central processing unit (CPU). The processor 120B may process the requests transmitted from the host device. In order to process the requests, the processor 120B may drive an instruction or algorithm of a code type, that is, a software, loaded in the random-access memory 130B, and may control internal function blocks and the nonvolatile memory device 200B.

The random-access memory 130B may be configured by any suitable random-access memory including, for example, a dynamic random-access memory (DRAM) or a static random-access memory (SRAM). The random-access memory 130B may store a software to be driven by the processor 120B. Further, the random-access memory 130B may store data necessary for driving of the software. Namely, the random-access memory 130B may operate as a working memory of the processor 120B.

Figure 27:
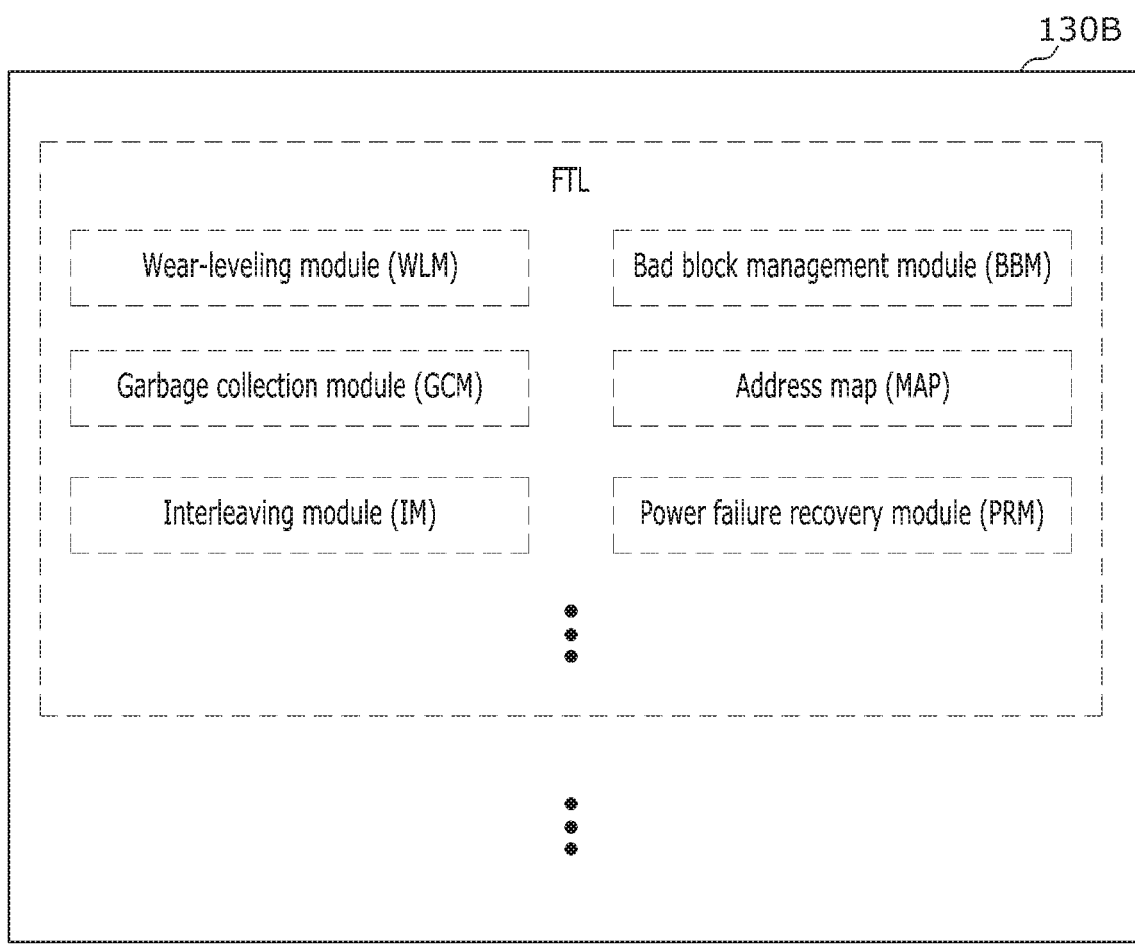
FIG. 27 is a diagram illustrating software driven in the data storage device in accordance with an embodiment of the present disclosure.

FIG. 27 is a diagram illustrating software stored in the random-access memory 130B. The software may be driven by the processor 120B.

In the case where the nonvolatile memory device 200B is a flash memory device, the software which is stored in the random-access memory 130B and is driven by the processor 120B is known as a flash translation layer FTL. The software may be driven by the processor 120B for controlling the intrinsic operations of the nonvolatile memory device 200B and provide device compatibility to the host device. Through driving of the software (e.g., an FTL in the case of a flash memory), the host device may recognize and use the data storage device 10B as a general data storage device such as a hard disk. The software, (e.g., the FTL) which is loaded in the random-access memory 130B may include a plurality of modules for performing various functions and metadata necessary for driving the modules.

Referring to FIG. 27, the software illustrated is an FTL. The FTL may include a wear-leveling module WLM, a bad block management module BBM, a garbage collection module GCM, an address map MAP, an interleaving module IM and a power failure recovery module PRM. However, it is to be noted that the modules included in the FTL are not specifically limited thereto.

The wear-leveling module WLM may manage wear levels for the memory blocks of the nonvolatile memory device 200B. The memory cells of the nonvolatile memory device 200B may wear out because of the repetitive erase and program operations. Worn-out memory cells may cause fails (for example, physical defects). The wear-leveling module WLM may manage the program-erase counts of respective memory blocks to be leveled so as to prevent a certain memory block from being worn out faster than the other memory blocks. That is, the wear-leveling module WLM may manage the wear levels of all the memory blocks included in the nonvolatile memory device 200B to retain similar levels.

The bad block management module BBM may manage a memory block in which a fail has occurred, among the memory blocks of the nonvolatile memory device 200B. As described above, a fail (for example, a physical defect) may occur in a worn-out memory cell. The data stored in a failed memory cell may not be read normally. Moreover, data may not be stored normally in a failed memory cell. The bad block management module BBM may manage a memory block including a failed memory cell not to be used.

The garbage collection module GCM may manage the nonvolatile memory device 200B to perform an operation of collecting the valid data stored and distributed in the memory blocks of the nonvolatile memory device 200B, to one memory block, and erasing invalid data.

The nonvolatile memory device 200B configured by a flash memory device does not support overwrite of data due to a structural characteristic thereof. If data is programmed again in a memory cell which is in a program state, the reliability of the data stored in the corresponding memory cell is not ensured. Therefore, in order to program data in a memory cell which is in a program state, an erase operation should be preceded.

Since an erase operation for the nonvolatile memory device 100 is performed by the unit of memory block, a substantially long time is required. Therefore, if a memory cell corresponding to an address to program is in a program state, instead of programming data after erasing the corresponding memory cell, the processor 120B programs data in another memory cell which is already in an erase state. In this case, the data stored in the memory cell to be originally programmed may be invalid data, and the data stored in another memory cell may be valid data.

Due to such an operation of the processor 120B, valid data and invalid data are mixed in the nonvolatile memory device 200B. If necessary, the processor 120B may perform a series of operations of collecting distributed valid data in one place, that is, one memory block, and erasing invalid data, by driving the garbage collection module GCM. Such a series of operations are referred to as a garbage collection operation.

The address map MAP may store pieces of address mapping information for an address translation operation. In the case where the host device accesses the data storage device 10B (for example, requests a read operation or a program operation), the host device may provide a logical address to the data storage device 10B. The flash translation layer FTL using the address map MAP may translate the logical address into an actual address, that is, a physical address, of the nonvolatile memory device 200B, and may perform a read operation or a program operation for memory cells corresponding to the translated physical address.

The interleaving module IM may manage a plurality of memory blocks included in one group in the nonvolatile memory device 200B to operate in parallel. As shown in FIG. 26, the nonvolatile memory device 200B may include the first to math super blocks SB1 to SBm. In order to increase a data processing amount, the processor 120B may drive the interleaving module IM and thereby simultaneously perform a program operation and a read operation for the plurality of memory blocks included in each of the first to math super blocks SB1 to SBm. In other words, by driving the interleaving module IM, the processor 120B may operate in parallel the memory blocks in each super block. For example, the processor 120B may operate in parallel the first memory blocks B1 included in the first super block SB1, or the second memory blocks B2 included in the second super block SB2 and so on and so forth the m^th memory blocks of the math super block SBm.

If power supplied to the data storage device 10B is suddenly cut off during a program operation for a memory cell, the program operation is not normally completed. When the data storage device 10B is recovered from an unexpected power failure (for example, a sudden power-off (SPO)), the processor 120B may manage a memory cell, a page or a memory block which has a high possibility of an error to occur due to the power failure, by using the power failure recovery module PRM.

The random-access memory 130B may operate as a data buffer memory or a data cache memory. For example, the random-access memory 130B may temporarily store data to be transmitted from the host device to the nonvolatile memory device 200B or from the nonvolatile memory device 200B to the host device.

The memory interface 140B may control the nonvolatile memory device 200B according to the control of the processor 120B. The memory interface 140B may also be referred to as a memory controller. The memory interface 140B may provide control signals to the nonvolatile memory device 200B. The control signals may include a command, an address and so forth, for controlling the nonvolatile memory device 200B. The memory interface 140B may provide data to the nonvolatile memory device 200B or may be provided with data from the nonvolatile memory device 200B. The memory interface 140B may be coupled with the nonvolatile memory device 200B through a channel CH including one or more signal lines.

Figure 28:
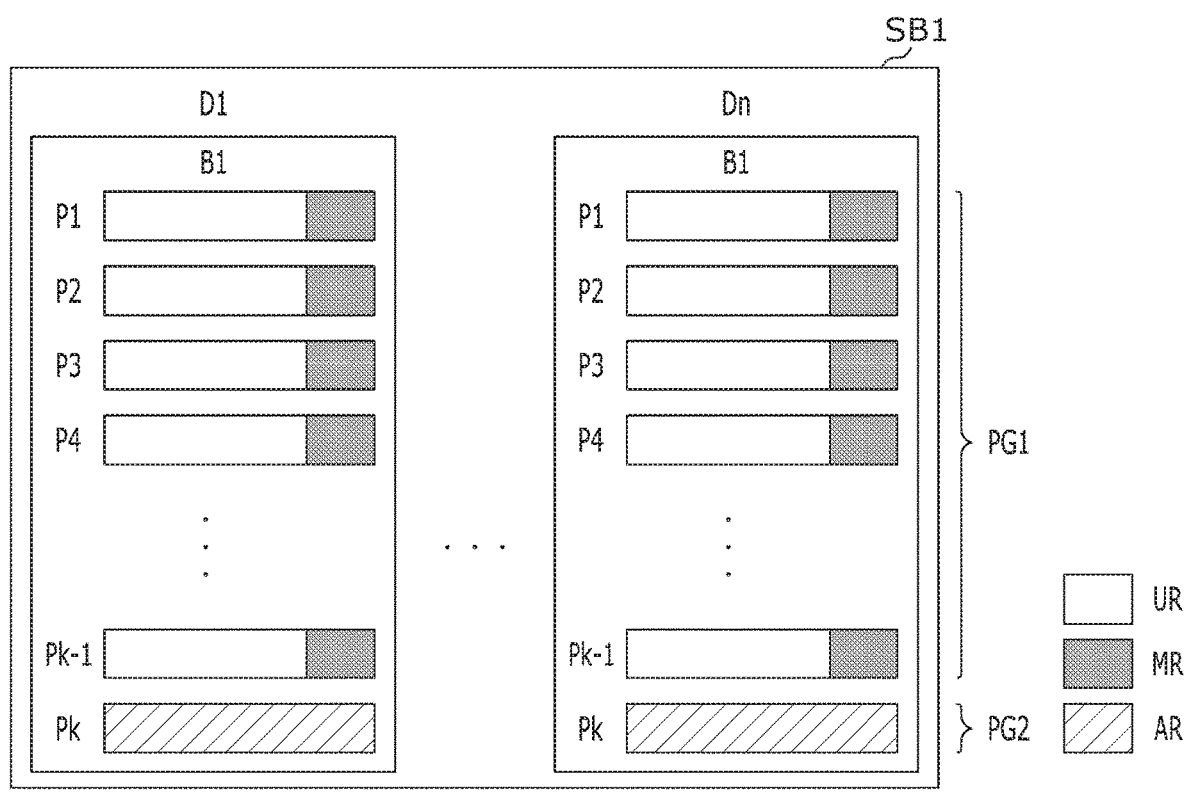
FIG. 28 is a diagram illustrating an example of a configuration of memory blocks included in one super block.

FIG. 28 is a diagram illustrating a configuration of memory blocks included in one super block. While FIG. 28 illustrates the first super block SB1 of FIG. 26 as an example, the memory blocks of the remaining super blocks may also have the same configuration as those shown in FIG. 28.

The first super block SB1 may include n number of first memory blocks B1 included in the first to n^th dies D1 to Dn. Each of the first memory blocks B1 may include k number of pages P1 to Pk. Here, n and k may be integers equal to or greater than 1. The first to k^th pages P1 to Pk may correspond to first to k^th word lines (not shown), respectively. Each of the first to k^th pages P1 to Pk may be one physical page and one or more logical pages.

The first to k^th pages P1 to Pk may be divided into a first page group PG1 and a second page group PG2. In FIG. 28, it is illustrated that the first page group PG1 includes the first to (k−1)^th pages P1 to Pk−1 and the second page group PG2 includes the k^th pages Pk. However, it is to be noted that the configuration of page groups is not limited specifically thereto.

Each of the first to (k−1)^th pages P1 to Pk−1 of the first page group PG1 may include a user region UR and a meta-region MR. The user region UR may be a region where the program data transmitted from the host device is stored. The meta-region MR may be a region where an information on the program data transmitted from the host device, an information on a program operation related with a program request, an information on a memory block to which the program operation is performed, and so forth are stored. An address mapping information on the program data stored in a corresponding page may be stored in the meta-region MR. For example, in the meta-region MR of each of the first to (k−1)^th pages P1 to Pk−1 of the first page group PG1, there may be stored a physical to logical (P2L) address entry for the program data stored in a corresponding page.

The P2L address entries stored in the meta-regions MR of the first to (k−1)^th pages P1 to Pk−1 may be stored in the k^th pages Pk of the second page group PG2. The k^th pages Pk of the second page group PG2 may be used as address regions AR where address mapping information (for example, P2L address entries) for the program data stored in the user regions UR of the first super block SB1 are stored.

If program operations are completed to the first to (k−1)^th pages P1 to Pk−1 of the first page group PG1 of the first super block SB1, the processor 220 may read out all the P2L address entries stored in the meta-regions MR of the first to (k−1)^th pages P1 to Pk−1 of the first page group PG1 and may store the read-out P2L address entries in the k^th pages Pk of the second page group PG2.

If a sudden power-off (SPO) occurs while the processor 120B stores, in the k^th pages Pk of the second page group PG2, the P2L address entries read out from the first page group PG1, the P2L address entries stored in the k^th pages Pk of the first super block SB1 may be damaged, and the k^th pages Pk of the first super block SB1 may not be used any more before performing an erase operation.

Each time a sudden power-off (SPO) occurs while sequentially performing program operations for the first to (k−1)^th pages P1 to Pk−1 of the first page group PG1 of the first super block SB1, the processor 120B detects an invalid page, generates at least one dummy page including the detected invalid page and continues a program operation from a page subsequent to the dummy page. For example, if a sudden power-off (SPO) occurs while performing a program operation for the (k−1)^th pages Pk−1 of the first super block SB1, the k^th pages Pk of the first super block SB1 become dummy pages and cannot be used as the address regions AR.

In this way, if a super block SB in which last pages (for example, k^th pages Pk) cannot be used as address regions AR occurs among the super blocks SB1 to SBm, the processor 120B may store the P2L address entries stored in the meta-regions MR of the first to (k−1)^th pages P1 to Pk−1 of the corresponding super block SB, in a system block (hereinafter, referred to as a 'map data block') allocated for storing map data.

Figure 29:
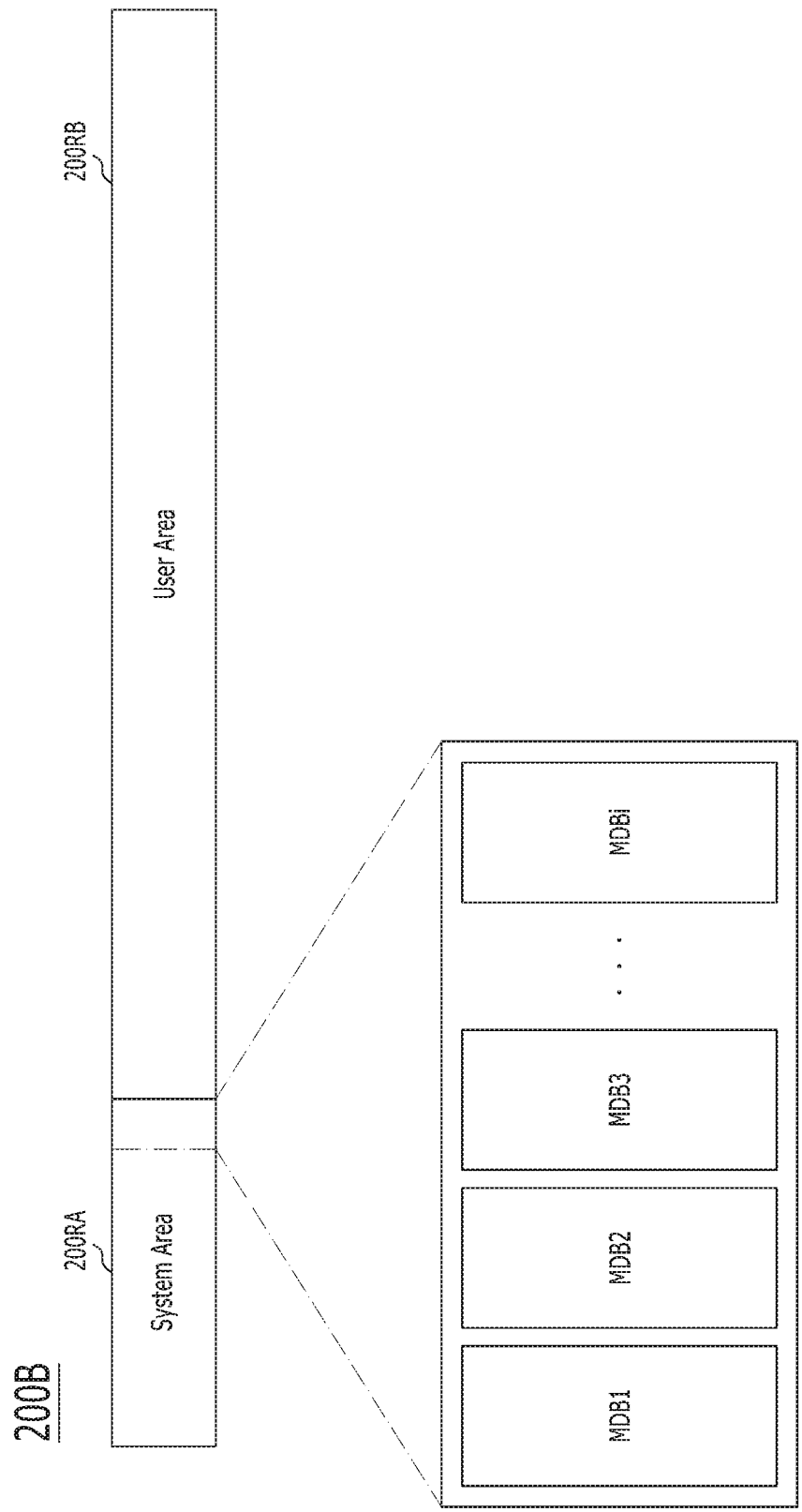
FIG. 29 is a diagram conceptually illustrating an example of area allocation of the nonvolatile memory device and map data blocks.

FIG. 29 is a diagram illustrating an area allocation of the nonvolatile memory device 200B and map data blocks. Referring to FIG. 29, the entire area of the nonvolatile memory device 200B may be allocated as a system area 200RA and a user area 200RB.

The system area 200RA may store meta-information for managing the nonvolatile memory device 200B, information on the characteristics of the nonvolatile memory device 200B or internal operations (for example, performance control, merge, wear-leveling, garbage collection, and so on) necessary for efficient management, a map table, and so forth. Although not shown specifically in FIG. 29, the system area 200RA may include a plurality of memory blocks, and the memory blocks of the system area 200RA may be managed by the unit of a single block. Single block may mean one physical block.

The user area 200RB of the nonvolatile memory device 200B may store the program-requested data (program data) from the host device, or the like. Although not shown specifically in FIG. 29, the user area 200RB may include a plurality of memory blocks, and the memory blocks of the user area 200RB may be managed by the unit of a super block SB (i.e., a plurality of physical blocks) as shown in FIG. 26.

The system area 200RA and the user area 200RB of the nonvolatile memory device 200B may be different set sizes. The controller 100B may transmit the size information of the user area 200RB of the nonvolatile memory device 200B to the host device, and, without a limiting sense, the host device may set the length of logical addresses to be transmitted to the data storage device 10B, based on the transmitted size information of the user area 200RB. The length of logical addresses may correspond to the number of logical addresses.

A set number of the memory blocks may be allocated to be map data blocks included in the system area 200RA of the nonvolatile memory device 200B. FIG. 29 illustrates an example in which i number of map data blocks MDB1 to MDBi are allocated. Here, 'i' may be an integer equal to or greater than 1. Each of the first to i^th map data blocks MDB1 to MDBi may store P2L address entries for one or more super blocks.

The maximum number of P2L address entries that can be stored in each of the first to i^th map data blocks MDB1 to MDBi may be set in advance. In general, since there is a P2L address entry corresponding to each valid data, the number of P2L address entries for a super block SB may correspond to the number of the valid data stored in that super block SB. Namely, in the present embodiment, the number of valid data for a super block SB is the same as the number of P2L address entries for that super block SB. The P2L address entries stored in the first to i^th map data blocks MDB1 to MDBi may be erased by an erase operation after garbage collection (GC) for one or more related super blocks SB is performed.

As described above, garbage collection (GC) refers to collecting the valid data distributed in a plurality of memory blocks to one memory block and performing an erase operation for memory blocks in which only invalid data are left. The larger that the number of valid data to be collected into one memory block is, the higher the garbage collection (GC) cost becomes. Increase in the cost of garbage collection (GC) means that a time required for performing garbage collection (GC) Increases. If a time required for performing garbage collection (GC) increases, the operation performance of the data storage device 10 may degrade.

If P2L address entries are stored in one map data block without a limit in the number thereof, the utilization of the map data block increases, but the cost of garbage collection (GC) for the super blocks related with the P2L address entries stored in the single map data block increases. If P2L address entries for only one super block are stored in one map data block, the cost of garbage collection (GC) decreases, but the utilization of the map data block decreases.

In consideration of this, in the present embodiment, the maximum number of P2L address entries to be stored in one map data block is set in advance, and the P2L address entries of one or more super blocks are stored such that the maximum number of P2L address entries set for each map data block is not exceeded.

Figure 30:
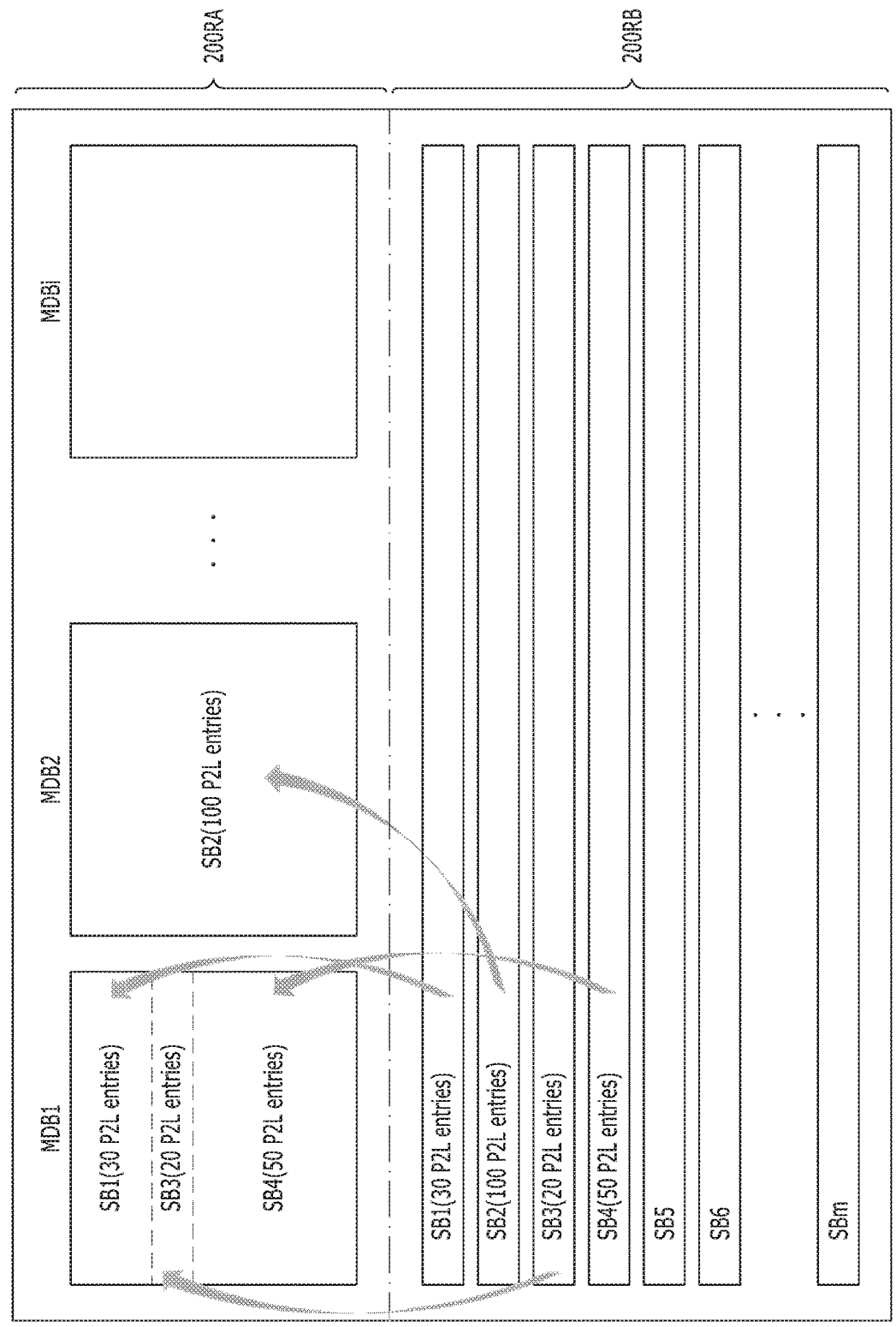
FIG. 30 is a diagram to assist in the explanation of storage of P2L entries of super blocks depending on the numbers thereof.

FIG. 30 is a diagram to assist in the explanation of storage of the P2L address entries of super blocks depending on the numbers of the P2L address entries corresponding to the respective super blocks. By way of example, in FIG. 30, it is assumed that the address regions AR (see FIG. 28) of the first to fourth super blocks SB1 to SB4 are damaged. Also, it is assumed that the numbers of the P2L address entries stored in the meta-regions MR of the first to fourth super blocks SB1 to SB4 are 30, 100, 20 and 50, respectively. Moreover, it is assumed that the maximum number of P2L address entries that can be stored in each of the first to i^th map data blocks MDB1 to MDBi is set to 100. Hereinafter, a map data block in use is referred to as an 'open map data block,' and a map data block before use is referred to as a 'free map data block.'

The processor 120B checks the number of the valid data of the first super block SB1. Since there is a piece of address mapping information (i.e., a P2L address entry) corresponding valid data, the processor 120B may determine the number of the valid data of the first super block SB1 based on the number of the P2L address entries stored in the meta-regions MR of the first page group PG1 (see FIG. 28) of the first super block SB1.

The processor 120B may control the nonvolatile memory device 200B to read out P2L address entries from the meta-regions MR of the first super block SB1 and store the read-out P2L address entries for the first super block SB1 in the first map data block MDB1 of the system area 200RA. Since the technology of reading out data from an arbitrary memory block and storing the read-out data in another memory block corresponds to a technology already know in the art, a detailed description will be omitted herein. As the P2L address entries for the first super block SB1 are stored, the first map data block MDB1 may become an open map data block.

If the first map data block MDB1 is full of the P2L address entries, the first super block SB1 may become a closed block. A closed block may mean a completely used block, for example, a block in which program for all pages is completed.

Since the number of the P2L address entries read out from the first super block SB1 is 30, the available capacity of the first map data block MDB1 may be 70 P2L address entries after the storage of the 30 number of P2L address entries.

The processor 120B determines the number of the valid data of the second super block SB2 based on the number of the P2L address entries stored in the meta-regions MR of the second super block SB2. The processor 120B may compare the number of the valid data of the second super block SB2 and the available capacity of the first map data block MDB1, and may determine whether or not the number of the valid data of the second super block SB2 is smaller than the available capacity of the first map data block MDB1.

Since the number of the valid data (i.e., the number of the P2L address entries) of the second super block SB2 is 100, it is larger than the currently available capacity (i.e., 70 number of P2L address entries) of the first map data block MDB1. Therefore, the processor 120B may control the nonvolatile memory device 200B to store the P2L address entries for the second super block SB2 in the second map data block MDB2 selected among free map data blocks.

The processor 120B determines the number of the valid data of the third super block SB3 based on the number of the P2L address entries stored in the meta-regions MR of the third super block SB3. The processor 120B may compare the number of the valid data of the third super block SB3 and the available capacity of the first map data block MDB1, and may determine whether or not the number of the valid data of the third super block SB3 is smaller than the available capacity of the first map data block MDB1.

Since the number of the valid data (i.e., the number of the P2L address entries) of the third super block SB3 is 20, it is smaller than the currently available capacity (i.e., 70 number of P2L address entries) of the first map data block MDB1. Therefore, the processor 120B may control the nonvolatile memory device 200B to store the P2L address entries for the third super block SB3 in the first map data block MDB1. Accordingly, the available capacity of the first map data block MDB1 may be 50 P2L address entries after the storage of the 20 number of P2L address entries.

The processor 120B determines the number of the valid data of the fourth super block SB4 based on the number of the P2L address entries stored in the meta-regions MR of the fourth super block SB4. The processor 120B may compare the number of the valid data of the fourth super block SB4 and the available capacity of the first map data block MDB1, and may determine whether or not the number of the valid data of the fourth super block SB4 is smaller than the available capacity of the first map data block MDB1.

Since the number of the valid data (i.e., the number of the P2L address entries) of the fourth super block SB4 is 50, it is equal to the currently available capacity (i.e., 50 number of P2L address entries) of the first map data block MDB1. Therefore, the processor 120B may control the nonvolatile memory device 200B to store the P2L address entries for the fourth super block SB4 in the remaining space of the first map data block MDB1.

Hence, the P2L address entries for the first super block SB1, the third super block SB3 and the fourth super block SB4 may be stored in the first map data block MDB1, and the P2L address entries for the second super block SB2 may be stored in the second map data block MDB2.

Although the number (for example, 3) of the super blocks related with the P2L address entries stored in the first map data block MDB1 is larger than the number (for example, 1) of the super blocks related with the P2L address entries stored in the second map data block MDB2, since the numbers of valid data are the same, there is no substantial difference between the cost of garbage collection (GC) for the super blocks related with the P2L address entries stored in the first map data block MDB1 and the cost of garbage collection (GC) for the super block related with the P2L address entries stored in the second map data block MDB2.

Also, since P2L address entries for a plurality of super blocks may be stored in one map data block, it is possible to efficiently use a limited number of map data blocks. In an embodiment, P2L address entries (or P2L information) may be stored in a management block (e.g., the level 2 management block) In FIG. 1.

Figure 31:
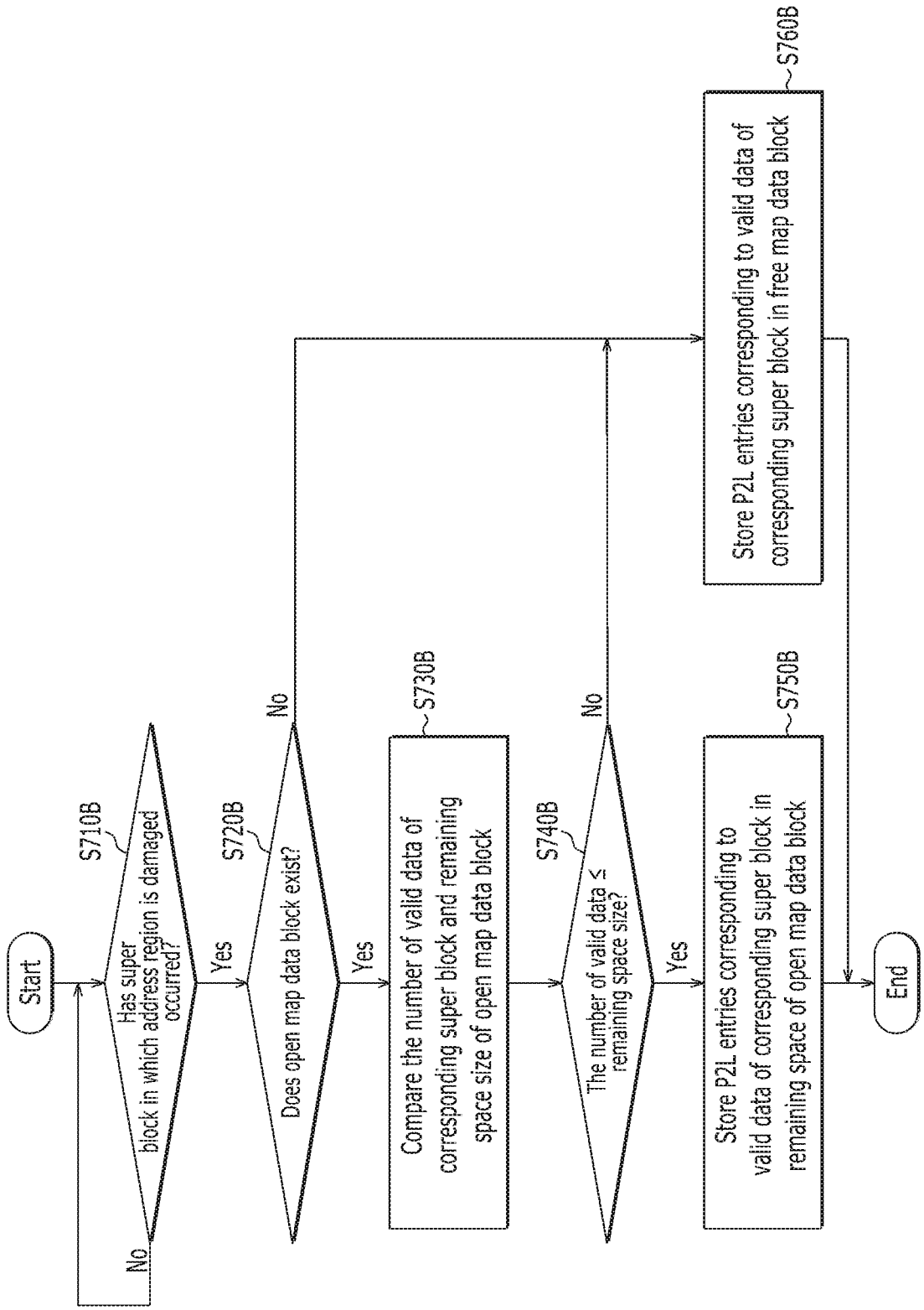
FIG. 31 is a flow chart illustrating an operating method of a data storage device in accordance with an embodiment of the present disclosure.

FIG. 31 is a flow chart illustrating an operating method of the data storage device 10B in accordance with an embodiment of the present disclosure. In explaining the operating method of the data storage device 10B illustrated in FIG. 31, additional reference may be made to FIGS. 25 to 30.

At step S710B, the processor 120B of the controller 100B may determine whether a super block SB in which an address region AR (see FIG. 28) is damaged occurs. A super block SB in which an address region AR is damaged may occur due to a sudden power-off (SPO) or the like. Since descriptions were made above for a case where a super block SB in which an address region AR is damaged occurs, detailed descriptions therefor will be omitted herein. If a super block SB in which an address region AR is damaged occurs, the process may proceed to step S720.

At the step S720B, the processor 120B may determine whether there is an open map data block among the first to i^th map data blocks MDB1 to MDBi (see FIG. 29) allocated in the system area 200RA (see FIG. 29) of the nonvolatile memory device 200B (see FIG. 29). An open map data block may mean a map data block which is being used, that is, a map data block in which less than a set number (for example, N) of P2L address entries are stored. If an open map data block exists, the process may proceed to step S730B.

At the step S730B, the processor 120B may compare the number of the valid data of the super block SB in which an address region AR is damaged and the available capacity of the open map data block. The number of the valid data of the super block SB may correspond to the number of the P2L address entries stored in the meta-regions MR (see FIG. 28) of the super block SB.

At step S740B, the processor 120B may determine whether the number of the valid data of the super block SB is equal to or smaller than the available capacity of the open map data block. If the number of the valid data is equal to or smaller than the available capacity (e.g., size of the remaining space) of the open map data block, the process may proceed to step S750B.

At the step S750B, the processor 120B may control the nonvolatile memory device 200B to read out the P2L address entries stored in the meta-regions MR of the super block SB in which an address region AR is damaged and store the read-out P2L address entries in the remaining space of the open map data block.

If an open map data block does not exist at the step S720B or the number of the valid data is larger than the available capacity of the open map data block at the step S740B, the process may proceed to step S760B.

At the step S760B, the processor 120B may control the nonvolatile memory device 200B to read out the P2L address entries stored in the meta-regions MR of the super block SB in which an address region AR is damaged and store the read-out P2L address entries in a free map data block. The free map data block used at this step may be selected by the processor 120B among the first to i^th map data blocks MDB1 to MDBi.

Figure 32:
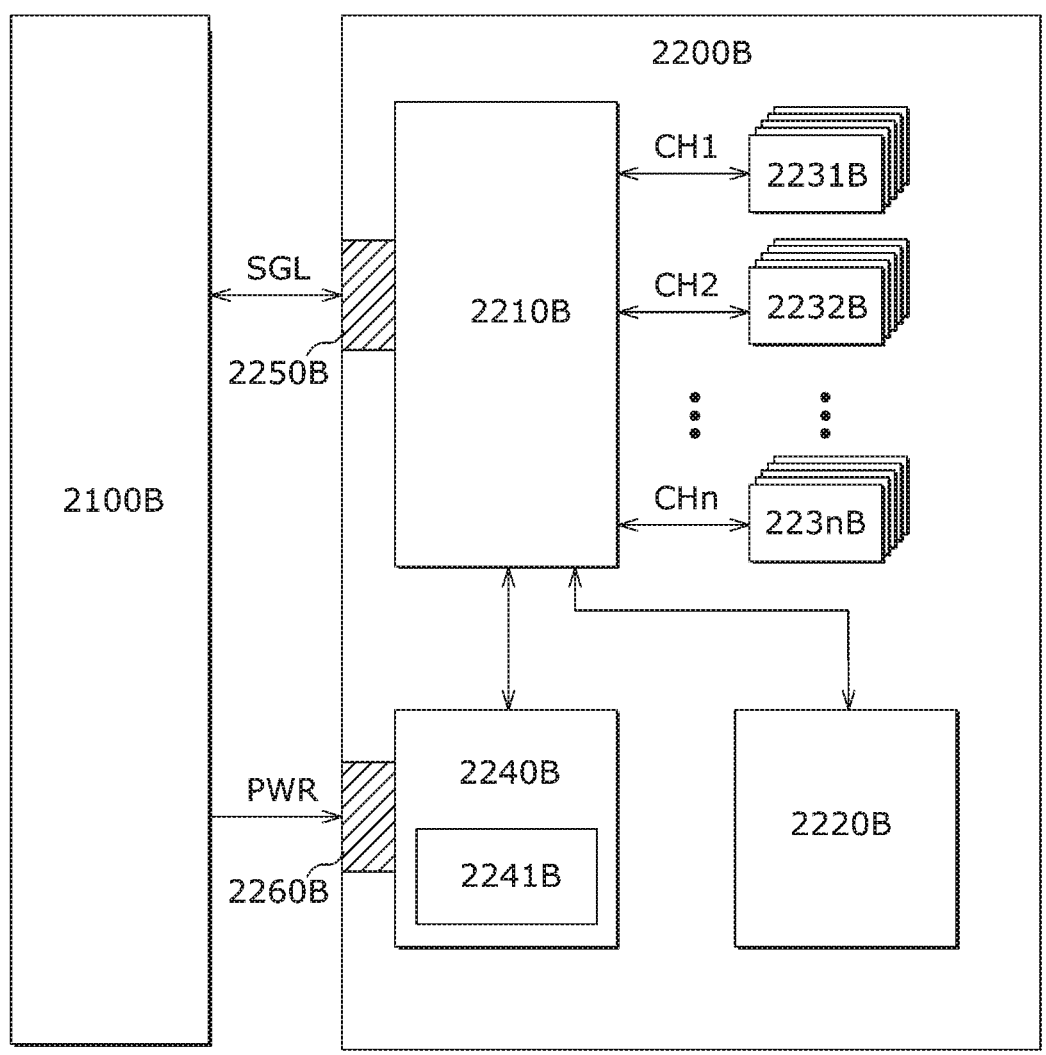
FIG. 32 is a diagram illustrating an example of a data processing system including a solid-state drive (SSD) in accordance with an embodiment of the present disclosure.

FIG. 32 is a diagram illustrating an example of a data processing system including a solid-state drive (SSD) in accordance with an embodiment. Referring to FIG. 32, a data processing system 2000B may include a host apparatus 2100B and an SSD 2200B.

The SSD 2200B may include a controller 2210B, a buffer memory device 2220B, non-volatile memory devices 2231B to 223Bn, a power supply 2240B, a signal connector 2250B, and a power connector 2260B.

The controller 2210B may control overall operation of the SSD 2220B.

The buffer memory device 2220B may temporarily store data to be stored in the nonvolatile memory devices 2231B to 223Bn. The buffer memory device 2220B may temporarily store data read from the nonvolatile memory devices 2231B to 223Bn. The data temporarily stored in the buffer memory device 2220B may be transmitted to the host apparatus 2100B or the nonvolatile memory devices 2231B to 223Bn according to control of the controller 2210B.

The nonvolatile memory devices 2231B1 to 2231Bn may be used as a storage medium of the SSD 2200B. The nonvolatile memory devices 2231B1 to 2231Bn may be coupled to the controller 2210B through a plurality of channels CH1 to CHn. One or more nonvolatile memory devices may be coupled to one channel. The nonvolatile memory devices coupled to the one channel may be coupled to the same signal bus and the same data bus.

The power supply 2240B may provide power PWR input through the power connector 2260B to the inside of the SSD 2200B. The power supply 2240B may include an auxiliary power supply 2241B. The auxiliary power supply 2241B may supply the power so that the SSD 2200B is normally terminated even when sudden power-off occurs. The auxiliary power supply 2241B may include large capacity capacitors capable of charging the power PWR.

The controller 2210B may exchange a signal SGL with the host apparatus 2100B through the signal connector 2250B. The signal SGL may include a command, an address, data, and the like. The signal connector 2250B may be configured as any of various types of connectors according to an interfacing method between the host apparatus 2100B and the SSD 2200B.

Figure 33:
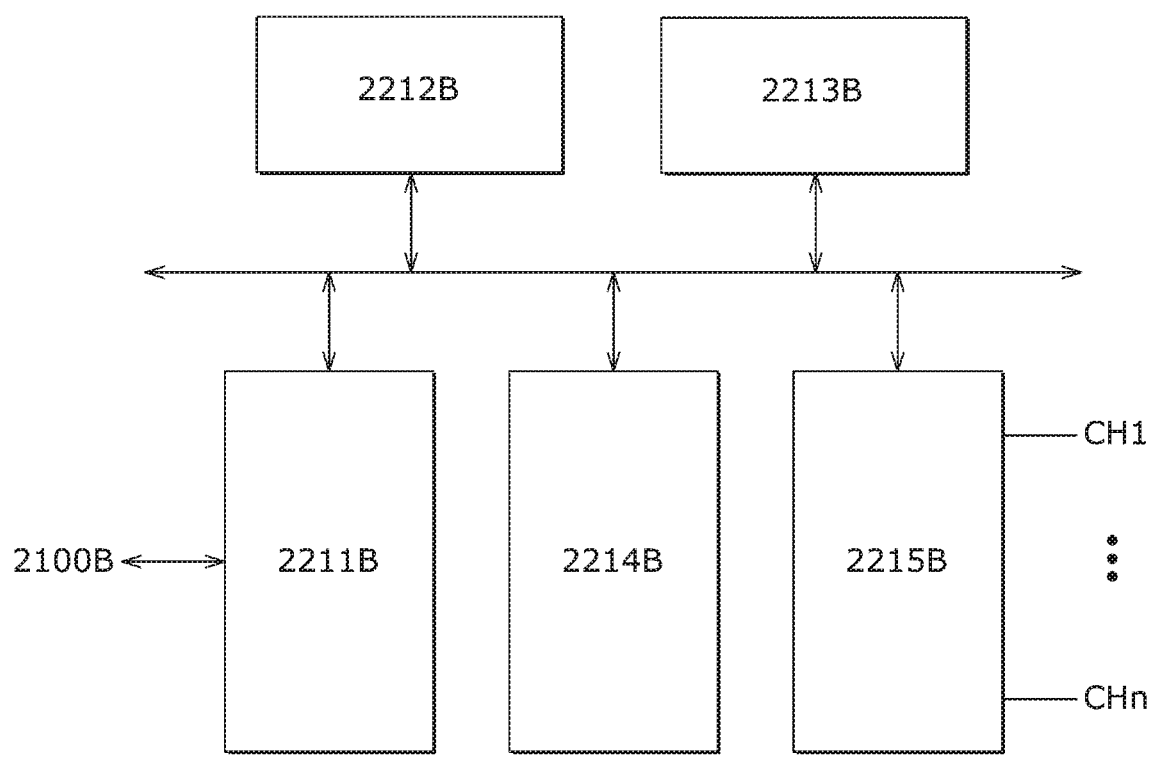
FIG. 33 is a diagram illustrating an example of a controller illustrated in FIG. 32.

FIG. 33 is a diagram illustrating an example of the controller 2210B of FIG. 32. Referring to FIG. 33, the controller 2210B may include a host interface unit 2211B, a control unit 2212B, a random-access memory (RAM) 2213B, an error correction code (ECC) unit 2214B, and a memory interface unit 2215B.

The host interface unit 2211B may perform interfacing between the host apparatus 2100B and the SSD 2200B according to a protocol of the host apparatus 2100B. For example, the host interface unit 2211B may communicate with the host apparatus 2100B through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211B may perform a disc emulation function that the host apparatus 2100B recognizes the SSD 2200B as a general-purpose data storage apparatus, for example, a hard disc drive HDD.

The control unit 2212B may analyze and process the signal SGL input from the host apparatus 2100B. The control unit 2212B may control operations of internal functional blocks according to firmware and/or software for driving the SDD 2200B. The RAM 2213B may be operated as a working memory for driving the firmware or software.

The ECC unit 2214B may generate parity data for the data to be transferred to the nonvolatile memory devices 2231B to 223Bn. The generated parity data may be stored in the nonvolatile memory devices 2231B to 223Bn together with the data. The ECC unit 2214B may detect errors for data read from the nonvolatile memory devices 2231B to 223Bn based on the parity data. When detected errors are within a correctable range, the ECC unit 2214B may correct the detected errors.

The memory interface unit 2215B may provide a control signal such as a command and an address to the nonvolatile memory devices 2231B to 223Bn according to control of the control unit 2212B. The memory interface unit 2215B may exchange data with the nonvolatile memory devices 2231B to 223Bn according to control of the control unit 2212B. For example, the memory interface unit 2215B may provide data stored in the buffer memory device 2220B to the nonvolatile memory devices 2231B to 223Bn or provide data read from the nonvolatile memory devices 2231B to 223Bn to the buffer memory device 2220B.

Figure 34:
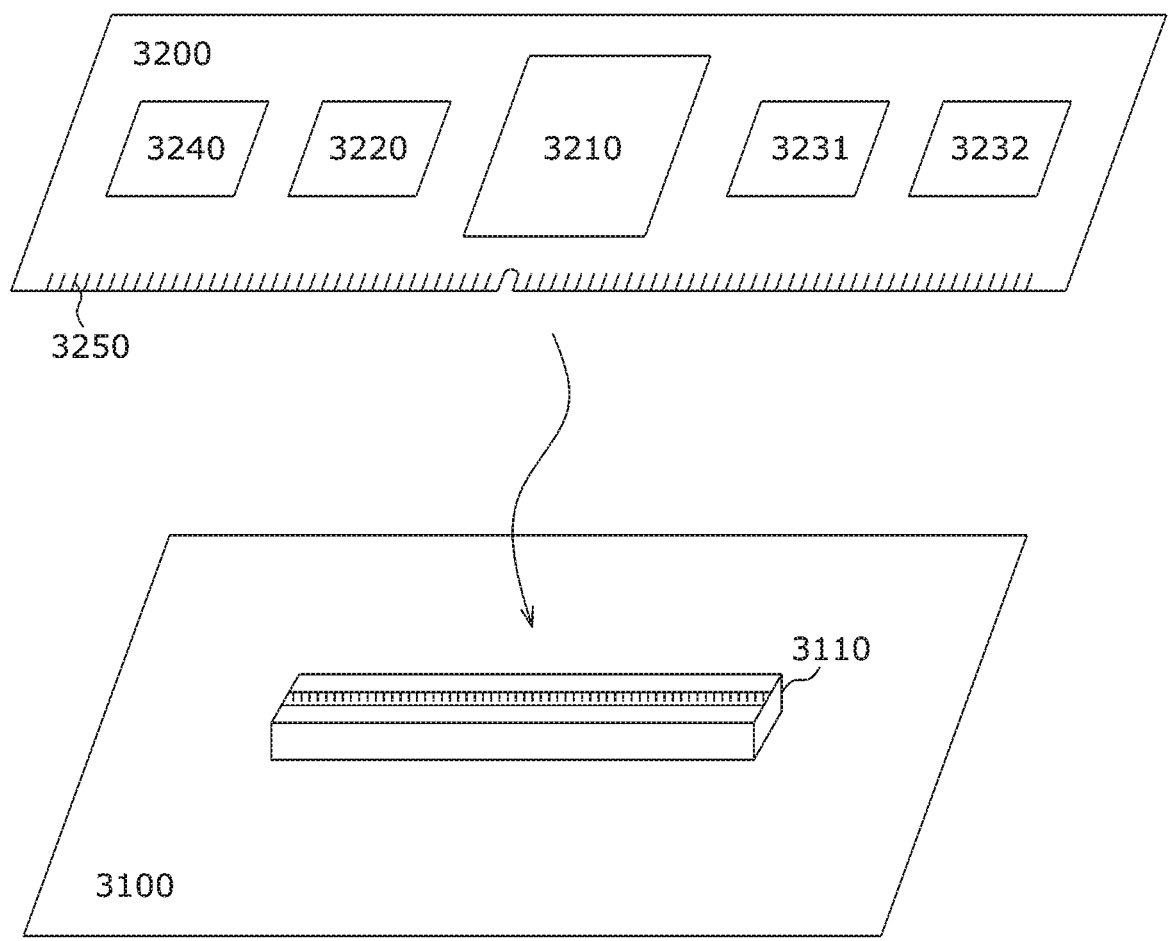
FIG. 34 is a diagram illustrating an example of a data processing system including a data storage apparatus in accordance with an embodiment of the present disclosure.

FIG. 34 is a diagram illustrating an example of a data processing system including a data storage apparatus in accordance with an embodiment. Referring to FIG. 34, a data processing system 3000 may include a host apparatus 3100 and a data storage apparatus 3200.

The host apparatus 3100 may be configured in a board form such as a printed circuit board (PCB). Although not shown in FIG. 34, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control overall operation of the data storage apparatus 3200. The controller 3210 may be configured the same as the controller 2210B illustrated in FIG. 33.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200. The connection terminal 3250 may be arranged in any one side of the data storage apparatus 3200.

Figure 35:
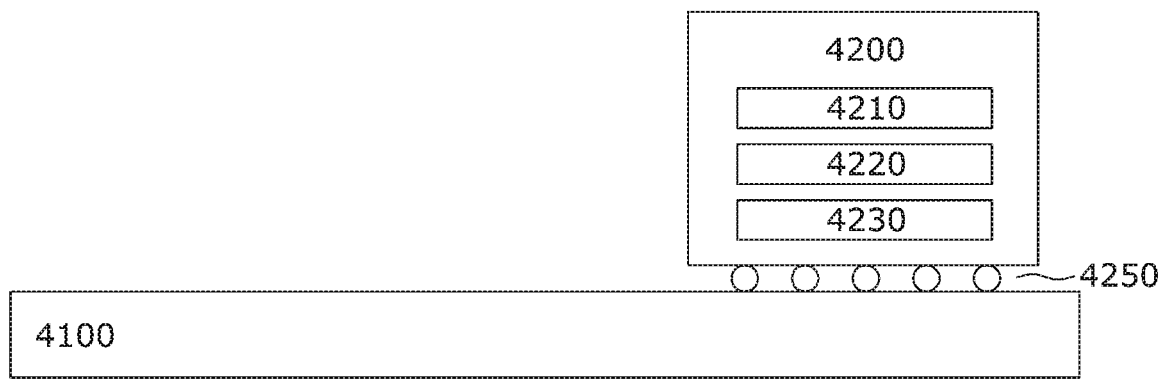
FIG. 35 is a diagram illustrating an example of a data processing system including a data storage apparatus in accordance with an embodiment of the present disclosure.

FIG. 35 is a diagram illustrating an example of a data processing system including a data storage apparatus in accordance with an embodiment. Referring to FIG. 35, a data processing system 4000 may include a host apparatus 4100 and a data storage apparatus 4200.

The host apparatus 4100 may be configured in a board form such as a PCB. Although not shown in FIG. 35, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control overall operation of the data storage apparatus 4200. The controller 4210 may be configured the same as the controller 2210B illustrated in FIG. 33.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 36:
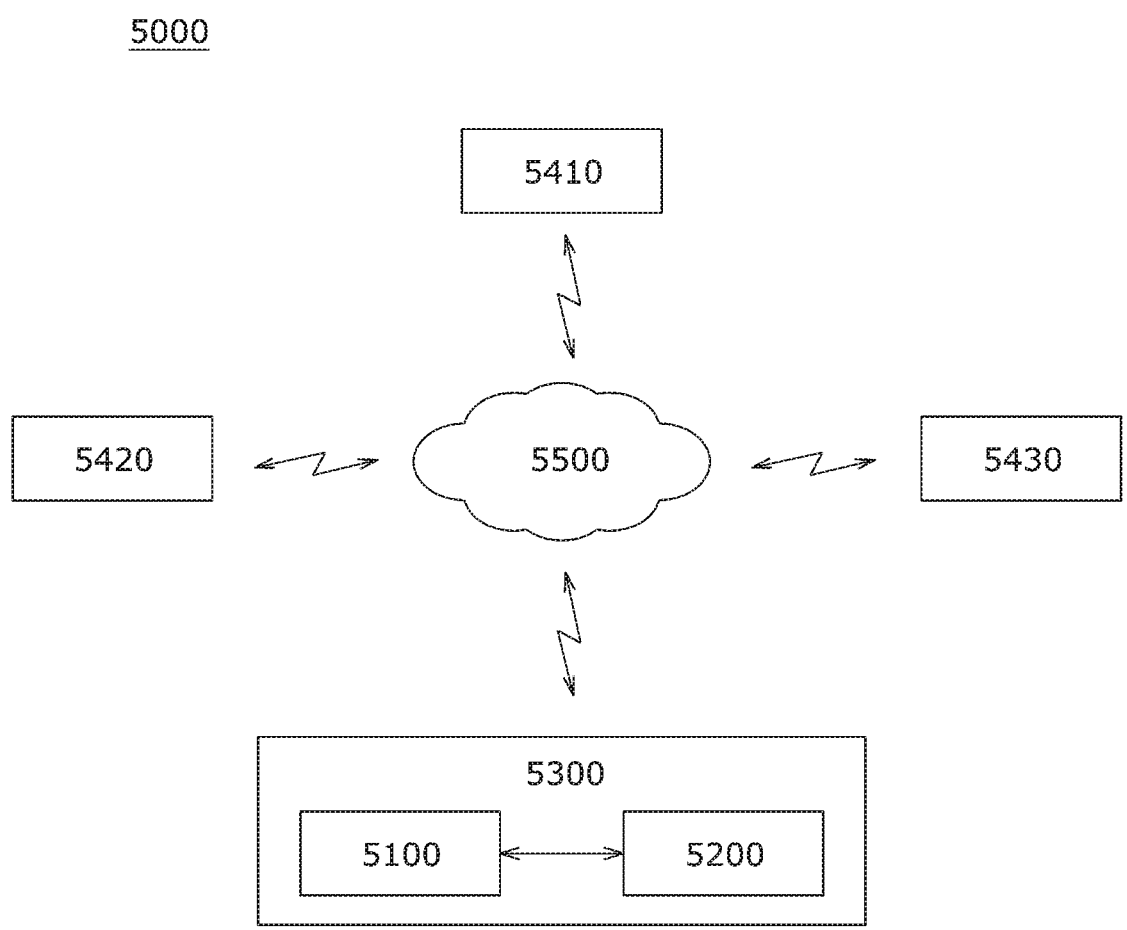
FIG. 36 is a diagram illustrating an example of a network system including a data storage apparatus in accordance with an embodiment of the present disclosure.

FIG. 36 is a diagram illustrating an example of a network system 5000 including a data storage apparatus in accordance with an embodiment. Referring to FIG. 36, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the data storage apparatus 10B of FIG. 25, the data storage apparatus 2200B of FIG. 32, the data storage apparatus 3200 of FIG. 34, or the data storage apparatus 4200 of FIG. 35.

Figure 37:
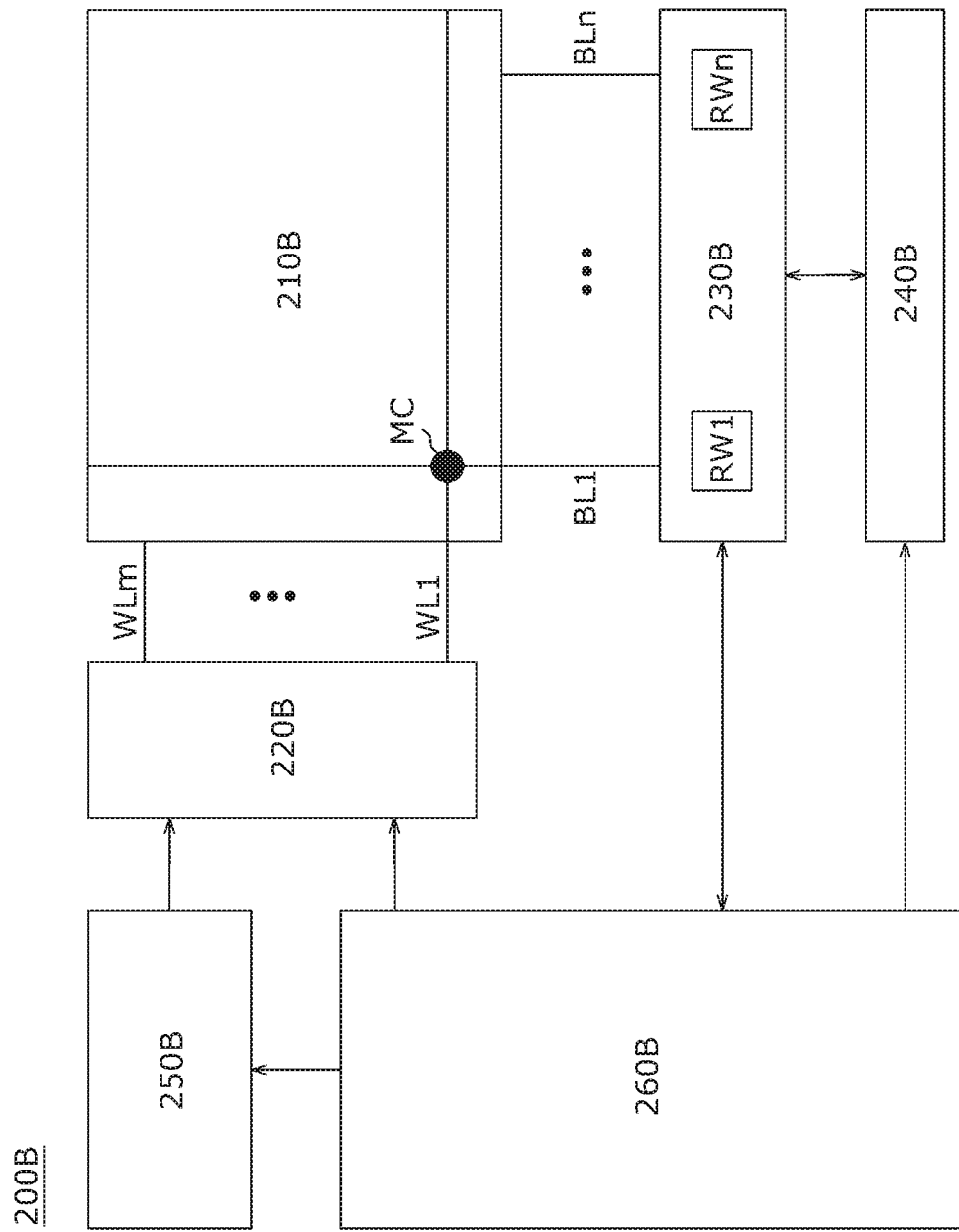
FIG. 37 is a block diagram illustrating an example of a nonvolatile memory device included in a data storage apparatus in accordance with an embodiment of the present disclosure.

FIG. 37 is a block diagram illustrating an example of a nonvolatile memory device included in a data storage apparatus in accordance with an embodiment. Referring to FIG. 37, a nonvolatile memory device 200B may include a memory cell array 210B, a row decoder 220B, a column decoder 240B, a data read/write block 230B, a voltage generator 250B, and a control logic 260B.

The memory cell array 210B may include memory cells MC arranged in regions in which word lines WL1 to WLm and bit lines BL1 to BLn cross to each other.

The row decoder 220B may be coupled to the memory cell array 210B through row lines including word lines WL1 to WLm. The row decoder 220B may operate through control of the control logic 260B. The row decoder 220B may decode an address provided from an external apparatus (not shown). The row decoder 220B may select and drive the word lines WL1 to WLm based on a decoding result. For example, the row decoder 220B may provide a word line voltage provided from the voltage generator 250B to the word lines WL1 to WLm.

The data read/write block 230B may be coupled to the memory cell array 210B through the bit lines BL1 to BLn. The data read/write block 230B may include read/write circuits RW1 to RWn corresponding to the bit lines BL1 to BLn. The data read/write block 230B may operate according to control of the control logic 260B. The data read/write block 230B may operate as a write driver or a sense amplifier according to an operation mode. For example, the data read/write block 230B may operate as the write driver configured to store data provided from an external apparatus in the memory cell array 210B in a write operation. In another example, the data read/write block 230B may operate as the sense amplifier configured to read data from the memory cell array 210B in a read operation.

The column decoder 240B may operate though control of the control logic 260B. The column decoder 240B may decode an address provided from an external apparatus (not shown). The column decoder 240B may couple the read/write circuits RW1 to RWn of the data read/write block 230B corresponding to the bit lines BL1 to BLn and data input/output (I/O) lines (or data I/O buffers) based on a decoding result.

The voltage generator 250B may generate voltages used for an internal operation of the nonvolatile memory device 200B. The voltages generated through the voltage generator 250B may be applied to the memory cells of the memory cell array 210B. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 260B may control overall operation of the nonvolatile memory device 200B based on a control signal provided from an external apparatus. For example, the control logic 260B may control an operation of the nonvolatile memory device 200B such as a read operation, a write operation, an erase operation of the nonvolatile memory device 200B.

In an embodiment, a data storage device may comprise: a nonvolatile memory device including a plurality of memory blocks; a controller configured to control the nonvolatile memory device; a plurality of management blocks including first and second management blocks managed by the controller, the second management block storing start data and then storing integrity data, the first management block storing a storage location of the second management block; and an integrity checker configured to check integrity of data associated with the first and second management blocks.

During booting, the controller may check the second management block through the first management block.

The integrity data may include data, the integrity of which was checked by the integrity checker.

The storage location of the second management block may be stored in the first management block after the integrity data is stored in the second management block.

The second management block may include a first region storing the start data and a second region subsequent to the first region and storing the integrity data.

The start data may include management data and the integrity data includes dummy data.

The plurality of memory blocks may include the plurality of management blocks.

In an embodiment, a data storage device may comprise: a nonvolatile memory device including a plurality of management blocks including a first management block, a second management block and two backup management blocks for backup the second management block; and a controller configured to control the second management block to store management data in a first region; control the first management block to store location data regarding a storage location of the second management block; control the second management block to store integrity check data associated with the location data, in a second region subsequent to the first region; and selectively perform a recovery operation to the first and second management blocks by checking a state of the second management block corresponding to the location data in the first management block.

In an embodiment, a data storage device may comprise: a nonvolatile memory device including first and second management blocks and a plurality of data blocks; and a controller configured to control the second management bock to store management data; control the first management block to store location data regarding a storage location of the second management block; check integrity of the location data to generate integrity check data in response to a request from a host; and control a select data block among the plurality of data blocks to store the integrity check data.

While various embodiments of the present disclosure have been illustrated and described, it will be understood to those skilled in the art that the disclosed embodiments are merely examples. Accordingly, the present invention is not limited to or by any of the disclosed embodiments. It will be apparent to those skilled in the art to which the present invention pertains that various other changes and modifications may be made without departing from the spirit and scope of the invention as defined in the following claims.

What is claimed is:

1. A data storage device comprising:
a nonvolatile memory device including a plurality of memory blocks;
a controller configured to control the nonvolatile memory device;
a plurality of management blocks including first and second management blocks managed by the controller, the second management block storing start data and then storing integrity data, the first management block storing a storage location of the second management block; and
an integrity checker configured to check integrity of data associated with the first and second management blocks.

2. The data storage device of claim 1, wherein, during booting, the controller checks the second management block through the first management block.

3. The data storage device of claim 1, wherein the integrity data includes data, the integrity of which was checked by the integrity checker.

4. The data storage device of claim 1, wherein the storage location of the second management block is stored in the first management block after the integrity data is stored in the second management block.

5. The data storage device of claim 1, wherein the second management block includes a first region storing the start data and a second region subsequent to the first region and storing the integrity data.

6. The data storage device of claim 1, wherein the start data includes management data and the integrity data includes dummy data.

7. The data storage device of claim 1, wherein the plurality of memory blocks includes the plurality of management blocks.

8. A data storage device comprising:
a nonvolatile memory device including a plurality of management blocks including a first management block, a second management block and two backup management blocks for backup the second management block; and
a controller configured to control the second management block to store management data in a first region;
control the first management block to store location data regarding a storage location of the second management block;
control the second management block to store integrity check data associated with the location data, in a second region subsequent to the first region; and
selectively perform a recovery operation to the first and second management blocks by checking a state of the second management block corresponding to the location data in the first management block.

9. The data storage device of claim 8,
wherein the controller performs a dummy write operation to a first region among multiple regions in the first management block when the current second management block does not include an empty region, and
wherein the first region follows, according to a write sequence, a second region in which the location data is stored, among the multiple regions.

10. The data storage device of claim 9, wherein the controller designates a new second management block after the dummy write operation is performed.

11. The data storage device of claim 8,
wherein the controller performs a copy operation of the location data for a first region among multiple regions in the first management block when the second management block retains only the management data, and
wherein the first region follows, according to a write sequence, a second region in which the location data is stored, among the multiple regions.

12. The data storage device of claim 11, wherein the controller stores the integrity check data in the second management block after the copy operation is performed.

13. The data storage device of claim 8, wherein the controller skips the recovery operation when the second management block retains the management data and the integrity check data and has at least one empty region.

14. The data storage device of claim 13,
wherein the controller performs a dummy write operation to a first region among multiple regions included in the second management block, and performs a copy operation of the management data stored in the second management block, for a second region among the multiple regions,
wherein the first region follows, according to a write sequence, a third region in which the management data is stored, and
wherein the second region follows, according to the write sequence, the first region.

15. The data storage device of claim 8, wherein the controller designates another management block when the second management block does not have an empty region.

16. The data storage device of claim 8, wherein the controller controls the second management block to store physical-to-logical (P2L) information as the management data.

17. A data storage device comprising:
a nonvolatile memory device including first and second management blocks and a plurality of data blocks; and
a controller configured to control the second management bock to store management data;
control the first management block to store location data regarding a storage location of the second management block;
check integrity of the location data to generate integrity check data in response to a request from a host; and
control a select data block among the plurality of data blocks to store the integrity check data.

* * * * *